(12) United States Patent
Yamagishi et al.

(10) Patent No.: US 6,672,154 B1
(45) Date of Patent: Jan. 6, 2004

(54) FLOW RATE SENSOR UNIT, FLOWMETER AND FLOW SENSOR

(76) Inventors: Kiyoshi Yamagishi, c/o Mitsui Mining & Smelting Co., Ltd., Corporate R&D Center, 1333-2, Haraichi, Ageo-shi, Saitama (JP); Kenji Tomonari, c/o Mitsui Mining & Smelting Co., Ltd., Corporate R&D Center, 1333-2, Haraichi, Ageo-shi, Saitama (JP); Shinichi Inoue, c/o Mitsui Mining & Smelting Co., Ltd., Corporate R&D Center, 1333-2, Haraichi, Ageo-shi, Saitama (JP); Takayuki Takahata, c/o Mitsui Mining & Smelting Co., Ltd., Corporate R&D Center, 1333-2, Haraichi, Ageo-shi, Saitama (JP)

(*) Notice: Subject to any disclaimer, the term of this patent is extended or adjusted under 35 U.S.C. 154(b) by 0 days.

(21) Appl. No.: 10/019,620
(22) PCT Filed: Jun. 21, 2000
(86) PCT No.: PCT/JP00/04057
§ 371 (c)(1), (2), (4) Date: Dec. 20, 2001
(87) PCT Pub. No.: WO00/79221
PCT Pub. Date: Dec. 28, 2000

(30) Foreign Application Priority Data

Jun. 24, 1999 (JP) .............................................. 11-178787
Sep. 21, 1999 (JP) .............................................. 11-267504
Sep. 21, 1999 (JP) .............................................. 11-267505

(51) Int. Cl.[7] ................................................. G01F 1/68
(52) U.S. Cl. ................................................... 73/204.22
(58) Field of Search .......................... 73/204.22, 204.24, 73/861.25, 861.21

(56) References Cited

U.S. PATENT DOCUMENTS

| | | | | |
|---|---|---|---|---|
| 5,763,787 A | * | 6/1998 | Gravel et al. | 73/756 |
| 5,780,737 A | * | 7/1998 | Wible et al. | 73/204.22 |
| 6,240,371 B1 | * | 5/2001 | Azar | 702/45 |
| 6,382,023 B1 | * | 5/2002 | Yonezawa et al. | 73/204.22 |
| 6,510,735 B2 | * | 1/2003 | Igarashi et al. | 73/204.22 |

* cited by examiner

Primary Examiner—Edward Lefkowitz
Assistant Examiner—Jewel Thompson
(74) Attorney, Agent, or Firm—Pitney, Hardin, Kipp & Szuch LLP

(57) ABSTRACT

A flow rate detector (5) including a heater and a temperature sensor is connected to a thermal conductor (6), and a fluid temperature detector (9) including a temperature sensor is connected to a thermal conductor (10). A housing (2) encloses the flow rate detector (5), the fluid temperature detector (9) and parts of thermal conductors (6, 10). The housing (2) also encloses a memory (1) that stores individual information of a flow rate sensor unit used for determining flow rates by using signals from a detector circuit containing the heater, the temperature sensor of the flow rate detector and the temperature sensor of the fluid temperature detector. The flow rate detector (5), the fluid temperature detector (9) and the memory (1) are connected to a plurality of leads (4) in the housing (2). The housing (2) is connected to a fluid channel (13), into which the thermal conductors (6, 10) extended. The flow rate sensor unit reduces the difference in measurment between the different sensor units.

21 Claims, 16 Drawing Sheets

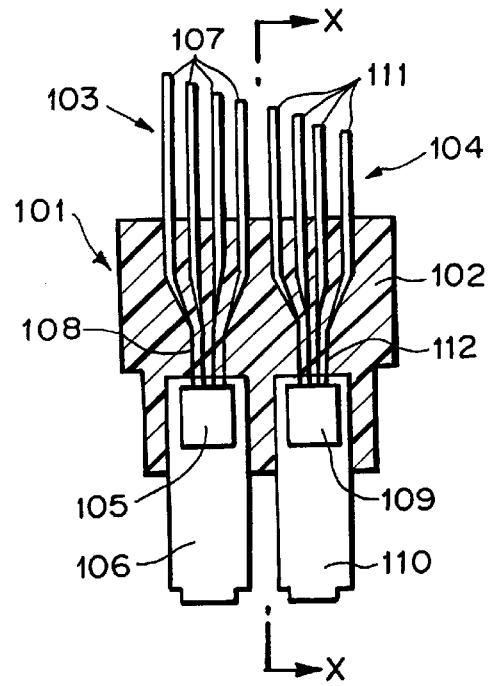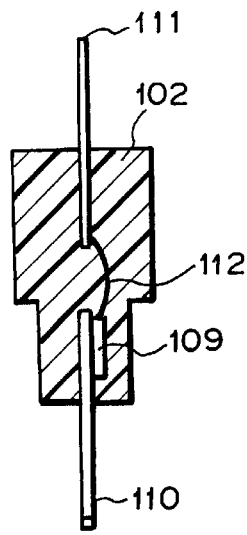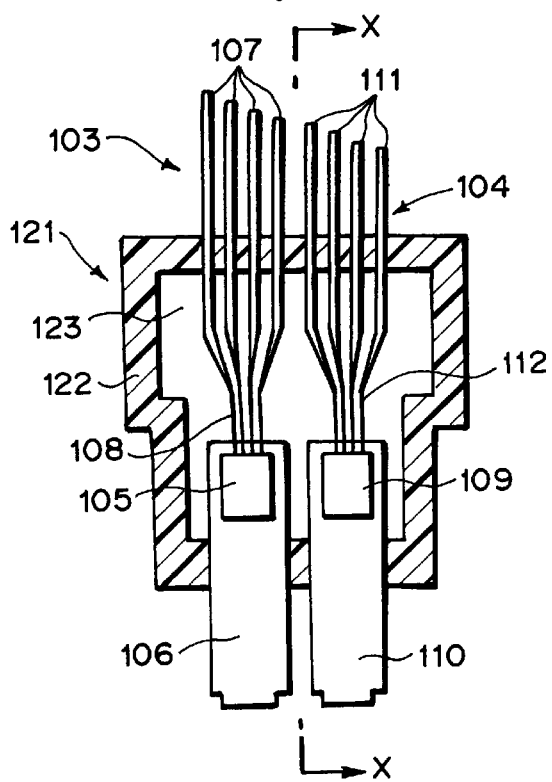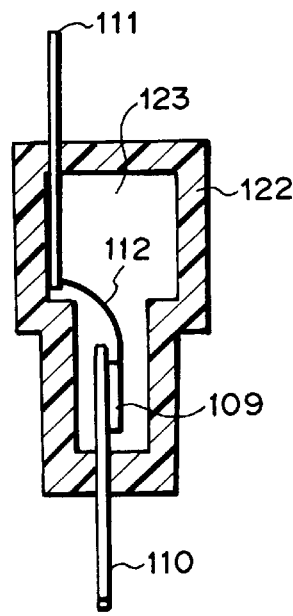

FLOW RATE SENSOR UNIT, FLOWMETER AND FLOW SENSOR

TECHNICAL FIELD

The present invention relates to a fluid flow rate detecting technique, and particularly to a flowmeter for determining the flow rate or integrated flow rate of fluid such as gas, liquid or the like and a flow rate sensor unit for use in the same, and a flow rate sensor for detecting the flow rate of fluid flowing in a pipe.

BACKGROUND TECHNIQUE

There have been hitherto used various types of flow rate sensors (or flow velocity sensors) for determining the flow rate (or flow velocity) of various kinds of fluid, particularly liquid, and a so-called thermal type (particularly, indirectly heated type) flow rate sensor has been used because the price thereof can be reduced.

There is used an indirectly heated type flow rate sensor in which a sensor chip having a thin film heater and a thin film temperature sensor laminated on a substrate through an insulating film by using the thin film technique is disposed so that heat can be transferred between the sensor chip and fluid in a pipe. By supplying current to the heater, the temperature sensor is heated to vary the electrical characteristic of the temperature sensor, for example, the value of the electrical resistance. The variation of electrical resistance value (based on temperature increase of the temperature sensor) is varied in accordance with the flow rate (flow velocity) of fluid flowing in the pipe. This is because a part of the heating value of the heater is transferred into the fluid, the heating value dispersed into the fluid is varied in accordance with the flow rate (flow velocity) of the fluid, and thus the heating value supplied to the temperature sensor is finally varied in accordance with the flow rate (flow velocity) of the fluid, so that the electrical resistance value of the temperature sensor is varied in accordance with the flow rate (flow velocity) of the fluid. The variation of the electrical resistance value of the temperature sensor is also different in accordance with the temperature of the fluid, and thus a temperature sensor for temperature compensation is installed in an electrical circuit for detecting the variation of the electrical resistance value of the temperature sensor to suppress the variation of the flow rate measurement value due to the temperature of the fluid as much as possible.

For example, an indirectly heated type flow rate sensor using a thin film element disclosed in JP(A)-8-146026, which is estimated to be excellent in thermal response, high in measurement precision, compact in size and low in cost, has the following construction.

That is, as shown in FIGS. 24A and 24B, a flow rate sensor 501 has a thin film heater 503 and a thin film temperature sensor 504 which are laminated on a substrate 502 through an insulating layer 505 by using the thin film technique, and it is used while disposed at a proper position of a pipe 506 as shown in FIG. 25.

In the flow rate sensor 501, the temperature sensor 504 is heated by supplying current to the heater 503 to detect the variation of the electrical resistance value of the temperature sensor 504. Since the flow rate sensor 501 is disposed in the pipe 506, a part of the heating value of the heater 503 is dispersed through the substrate 502 to the fluid flowing in the pipe, and thus the heating value transferred to the temperature sensor 504 corresponds to the value achieved by subtracting the dispersed heating value from the heating value of the heater 503. Further, since the dispersed heating value is varied in accordance with the flow rate of the fluid, the flow rate of the fluid flowing in the pipe 506 can be determined by detecting the variation of the electrical resistance value of the temperature sensor 504 which varies in accordance with the heating amount being supplied thereto.

Furthermore, since the dispersed heating value is also varied in accordance with temperature, a temperature sensor 507 is disposed at a proper position of the pipe 506 as shown in FIG. 25, and a temperature compensating circuit is added in the flow rate detecting circuit for detecting the variation of the electrical resistance value of the temperature sensor 504 to reduce the error of the flow rate measurement value due to the temperature of the fluid at maximum.

However, the conventional flow rate sensor 501 is directly mounted on the metal pipe 506, and also the metal pipe 506 is exposed to the outside air. Therefore, the heating value of fluid itself is dispersed to the outside air through the metal pipe having high thermal conductivity, or the heating value of the outside air is liable to be supplied to the fluid, resulting in reduction in the measurement precision of the flow rate sensor 501. Particularly when the flow rate of fluid is very low, it has a great effect on the measurement precision, and thus when the temperature difference between the fluid and the outside air is large or when the specific heat of the fluid is small, the effect is more remarkable.

When the fluid is viscous fluid, particularly viscous fluid having relatively high-viscosity, particularly liquid, the flow velocity in the cross-section perpendicular to the flow direction of the fluid in the pipe 506 is largely different between the portion in the neighborhood of the pipe wall and the center portion, and the flow velocity vector exhibits a substantially parabolic distribution having the extreme value at the center portion. That is, the non-uniformity of the flow velocity distribution is remarkable.

In the case where the substrate 502 or a casing 508 connected to the substrate 502 is merely mounted on the pipe wall and exposed to the fluid to detect the flow velocity at only the portion in the neighborhood of the pipe wall as described above, the flow velocity distribution has a large effect on the precision of the flow rate measurement. This is because no consideration is given to the flow velocity of fluid flowing at the central portion in the cross-section of the pipe and consideration is given to only the flow velocity of fluid flowing in the neighborhood of the pipe wall of the pipe. As described above, when the fluid is viscous fluid having relatively high viscosity, the conventional flow rate sensor has a problem that it is difficult to accurately determine the flow rate. Even when the fluid has low viscosity at normal temperature, the viscosity increases as the temperature is reduced, so that the problem associated with the fluid viscosity as described above occurs. Particularly, the above problem based on the viscosity is more remarkable when the flow rate per unit time is relatively small than when the flow rate per unit time is large.

Further, the flow rate sensor 501 is used under various different environments such as geographical conditions, indoors/outdoors, etc., and various other factors such as season conditions, day/night, etc. are also added particularly outdoors, so that consideration must be given to temperature variation due to external environments. However, the conventional flow rate sensor 501 is designed to be likely influenced by such external environmental temperature, so that the measurement value of the flow rate has a large error. Therefore, a flow rate sensor that can determine the flow rate with high precision under broad external environmental temperature has been required.

In order to solve this problem, a flow rate sensor as shown in FIG. 26 has been proposed. This is substantially the same as disclosed in JP(A)-11-118566, for example.

In FIG. 26, a flow rate detector 306 having a thin film heater and a thin film temperature sensor which are laminated on a substrate 302 through an insulating layer is mounted on a horizontal portion 307a of a fin plate 307 which is bent in an L-shape, thereby forming a flow rate sensor 301. In a casing 308, glass 310 is sealingly filled between the vertical portion 307b of the fin plate 307 and the opening portion of a flow pipe 309, and the flow rate detector 306 and the overall horizontal portion 307a of the fin plate 307 are hermetically coated and fixed by synthetic resin 311. The upper portion of the casing 308 is covered by a lid 312.

Reduction in the measurement precision of the flow rate due to the dispersion of heating value to the outside air or supply of heating value from the outside air, variation of flow rate in the lateral cross-section of the pipe, the effect of the external temperature environment, etc. can be greatly overcome by the flow rate sensor 301 described above.

However, in the above flow rate sensor 301, the flow rate detector 306 and the synthetic resin 311 are directly brought into contact with each other, so that the heating value owned by the temperature sensor flows out to the synthetic resin 311 or the heating value flows from the synthetic resin 311 into the temperature sensor. Further, the flow rate detector 306 is joined to the horizontal portion 307a of the fin plate 307 by joint material 313 of silver paste having excellent thermal conductivity or the like, so that the heating value transferred through the fin plate 307 flows out to the synthetic resin 311 through the joint material 313, or the heating value flows out from the synthetic resin 311 to the fin plate 307. Accordingly, when the specific heat of the fluid is small or when the flow rate is low, the sensitivity of the flow rate sensor 301 may be reduced.

Besides, the glass 310 is filled between the vertical portion 307b of the fin plate 307 and the opening portion of the flow pipe 309 to intercept the thermal transfer. However, when the fin plate is minutely vibrated due to the fluid flow and the sealing state becomes imperfect, the heating value transferred through the fin plate 307 flows out to the casing 308 through the metal flow pipe 309 having excellent thermal conductivity or the heating value flows from the casing 308 into the fin plate 307. Accordingly, when the specific heat of the fluid is small or when the flow rate is low, the sensitivity of the flow rate sensor 301 may be reduced as in the foregoing case.

The present invention has an object to solve the above problem and provide a flow rate sensor that can suppress flow-in/flow-out of heating value between each part of the flow rate sensor and a casing/the external to determine the flow rate with high precision even when the specific heat of fluid is small, when the flow rate is low, etc., and can be easily fabricated and reduced in cost.

The flow rate sensor disclosed in the above JP(A)-11-118566 uses an electrical circuit containing a bridge circuit to achieve the electrical output corresponding to the flow rate of fluid.

In general, the output of the electrical circuit of the flow rate sensor has no simple proportional relationship with the flow rate value. Therefore, in order to convert the output of the electrical circuit to the flow rate value, data processing using a calibration curve may be carried out. The data processing is carried out by using a microcomputer, and digital signals indicating the flow rate value may be input to a display device or transmitted to a desired remote place through a communication line.

However, with respect to the flow rate sensor as described above, it is required to throw the contact portion thereof with fluid and the surrounding portion thereof away periodically or after a predetermined amount of fluid flows. For example, when the flow rate sensor is applied to determine the flow rate of raw materials in a process of synthesizing high-purity reagent or medicines, throw-away is required from the viewpoint of surely preventing purity-reduction of products due to contamination of impurities. Further, when it is applied to a flow rate measurement of samples in a chemical analysis such as chemical titration or the like, throw-away is required from the viewpoint of preventing an adverse effect on the analysis due to unexpected chemical reactions because the components contained in the samples are unknown. Still further, when it is applied to a flow rate measurement of liquid medicines being injected into a living body or a flow rate measurement of a body fluids picked up from a living body, throw-away is required from the viewpoint of preventing disease infection.

Actually, the throw-away portions have been strongly required to be miniaturized in size and reduced in cost. Therefore, it has been considered to unify a thermal conductor to be extended into a fluid flowing pipe, a sensor chip fixed to the thermal conductor and wires connected to the terminals of the sensor chip into a unit as a throw-away portion.

However, in this case, the following problem occurs. That is, when a sensor unit thus unified as described above is used as a disposable unit, a common calibration curve is used for plural sensor units in a data processing circuit to convert the output of the electrical circuit to the flow rate value. The calibration curve regulates a standard relationship, and no consideration is given to an individual condition of each sensor. However, actually, the orientation of the thermal conductor to be extended to the external, the joint state between the sensor chip and the thermal conductor, the connection state between the sensor chip and the wires are minutely varied every sensor unit, and thus the relationship between the flow rate supporting output and the flow rate value is frequently varied every sensor unit. In this case, a measurement error occurs in the flow rate measurement due to the individual difference among sensor units, and thus the measurement precision is reduced.

Therefore, an object of the present invention is to provide a flow rate sensor unit which can suppress occurrence of a flow rate measurement error due to the individual difference of sensor units.

Further, another object of the present invention is to provide a flowmeter which can suppress occurrence of a flow rate measurement error due to the individual difference of sensor units.

SUMMARY OF THE INVENTION

In order to attain the above objects, according to the present invention, there is provided a flow rate sensor unit in which a flow rate detector having a heater and a flow rate detecting temperature sensor is joined to a flow rate detecting thermal conductor, and the flow rate detector and a part of the flow rate detecting thermal conductor are accommodated in a housing, characterized in that the housing encloses a memory for storing individual information of the flow rate sensor unit used when a flow rate value is achieved on the basis of a detection signal of a detecting circuit containing the heater and the flow rate detecting temperature sensor, and the flow rate detector and the memory are connected to plural leads in the housing, the plural leads being partially exposed to the outside of the housing.

In an aspect of the present invention, a fluid temperature detector containing a fluid temperature detecting temperature sensor is joined to a fluid temperature detecting thermal conductor, the housing encloses the fluid temperature detector and a part of the fluid temperature detecting thermal conductor, the detecting circuit contains the fluid temperature detecting temperature sensor, and in the housing the fluid temperature detector is connected to plural leads which are partially exposed to the outside of the housing.

In an aspect of the present invention, the individual information stored in the memory is correction information for a standard calibration curve used when the flow rate value is achieved on the basis of the detection signal of the detecting circuit.

In an aspect of the present invention, a fluid channel is connected to the housing, and the other part of the flow rate detecting thermal conductor extends into the fluid channel. In an aspect of the present invention, a fluid channel is connected to the housing, and the other part of the fluid temperature detecting thermal conductor extends into the fluid channel.

In order to attain the above objects, according to the present invention, there is also provided a flowmeter including the above flow rate sensor unit and an electrical circuit portion connected to the leads of the flow rate sensor unit, wherein the electrical circuit portion achieves the fluid flow rate value on the basis of the detection signal of the detecting circuit by referring to a standard calibration curve stored in advance, and at that time corrects the standard calibration curve by using the individual information stored in the memory of the flow rate sensor unit.

In an aspect of the present invention, the electrical circuit portion includes an analog circuit portion for achieving the output corresponding to the flow rate of the fluid by using the detection signal of the detecting circuit, and a digital circuit portion for achieving the fluid flow rate value on the basis of the output of the analog circuit, and the digital circuit portion includes a microcomputer and a main memory for storing the standard calibration curve.

In an aspect of the present invention, the individual information stored in the memory of the flow rate sensor unit reflects plural relationships between the output value corresponding to the fluid flow rate actually-measured for the flow rate sensor unit and the true fluid flow rate value.

In an aspect of the present invention, the leads of the flow rate sensor unit and the electrical circuit portion are detachably connected to each other.

In order to attain the above objects, according to the present invention, there is also provided a flow rate sensor unit in which a flow rate detector having a heater and a flow rate detecting temperature sensor is joined to a flow rate detecting thermal conductor, and the flow rate detector and a part of the flow rate detecting thermal conductor are accommodated in a housing, characterized in that a fluid channel is connected to the housing, the other part of the flow rate detecting thermal conductor extends into the fluid channel, a thermal conductor extending from the inside of the housing into the fluid channel is disposed, the housing encloses a memory for storing individual information of the flow rate sensor unit used when a flow rate value is achieved on the basis of a detection signal of a detecting circuit containing the heater and the flow rate detecting temperature sensor, and the flow rate detector and the memory are connected to plural leads in the housing, the plural leads being partially exposed to the outside of the housing.

In an aspect of the present invention, a fluid temperature detector containing a fluid temperature detecting temperature sensor is joined to a fluid temperature detecting thermal conductor, the housing encloses the fluid temperature detector and a part of the fluid temperature detecting thermal conductor, the other part of the fluid temperature detecting thermal conductor extends into the fluid channel, the detecting circuit contains the fluid temperature detecting temperature sensor, and in the housing the fluid temperature detector is connected to plural leads which are partially exposed to the outside of the housing.

In an aspect of the present invention, the individual information stored in the memory is correction information for a standard calibration curve used when the flow rate value is achieved by using the detection signal of the detecting circuit.

In an aspect of the present invention, the thermal conductor extends to be nearer to the portions of the leads in the housing than the flow rate detecting thermal conductor. In an aspect of the present invention, the thermal conductor extends to be nearer to the portions of the leads in the housing than the fluid temperature detecting thermal conductor.

In an aspect of the present invention, the memory is joined to the thermal conductor.

In an aspect of the present invention, the flow rate detecting thermal conductor, the fluid temperature detecting thermal conductor and the thermal conductor are designed in a plate shape, and arranged along the direction of the fluid channel on the same plane in the fluid channel.

In order to attain the above objects, according to the present invention, there is also provided a flowmeter containing the above flow rate sensor unit and an electrical circuit portion connected to the leads of the flow rate sensor unit, wherein the electrical circuit portion achieves the fluid flow rate value on the basis of the detection signal of the detecting circuit by referring to a standard calibration curve stored in advance, and at that time corrects the standard calibration curve by using the individual information stored in the memory of the flow rate sensor unit.

In an aspect of the present invention, the electrical circuit portion includes an analog circuit portion for achieving the output corresponding to the flow rate of the fluid by using the detection signal of the detecting circuit, and a digital circuit portion for achieving the fluid flow rate value on the basis of the output of the analog circuit, and the digital circuit portion includes a microcomputer and a main memory for storing the standard calibration curve.

In an aspect of the present invention, the individual information stored in the memory of the flow rate sensor unit reflects plural relationships between the output value corresponding to the fluid flow rate actually-measured for the flow rate sensor unit and the true fluid flow rate value.

In an aspect of the present invention, the leads of the flow rate sensor unit and the electrical circuit portion are detachably connected to each other.

In order to attain the above objects, according to the present invention, there is also provided a flow rate sensor comprising a flow rate measuring portion for detecting the flow rate of fluid, a temperature compensating measuring portion for compensating an effect of fluid temperature on measurements of the flow rate measuring portion, and a housing, wherein the flow rate measuring portion includes a flow rate detector having a heater and a temperature sensor laminated each other through an insulator, a fin plate joined to the flow rate detector at one end thereof, and an output terminal electrically connected to the flow rate detector, the temperature compensating measuring portion includes a temperature detector having an insulator and a temperature sensor that are laminated on each other, a fin plate joined to the temperature detector at one end thereof, and an output terminal electrically connected to the temperature detector, the housing encloses the flow rate detector and the temperature detector therein, and the fin plates and the output terminals of the flow rate measuring portion and the temperature compensating measuring portion are projected to the outside of the housing.

The housing is preferably formed of synthetic resin having thermal conductivity of 0.7 W/m·K or less. In the flow rate sensor according to the present invention, it is preferable that a cavity portion is provided in the housing, and the flow rate detector and the temperature detector are mounted at a position of the cavity portion at which the flow rate detector and the temperature detector are not brought into contact with the housing.

BRIEF DESCRIPTION OF THE DRAWINGS

FIGS. 18A and 18B are longitudinally-sectional views showing the. embodiment of the flow rate sensor of the present invention;

FIGS. 19A and 19B are longitudinally-sectional views showing another embodiment of the flow rate sensor according to the present invention;

DETAILED DESCRIPTION OF THE PREFERRED EMBODIMENTS

Preferred embodiments according to the present invention will be described with reference to the accompanying drawings.

Figure 1:
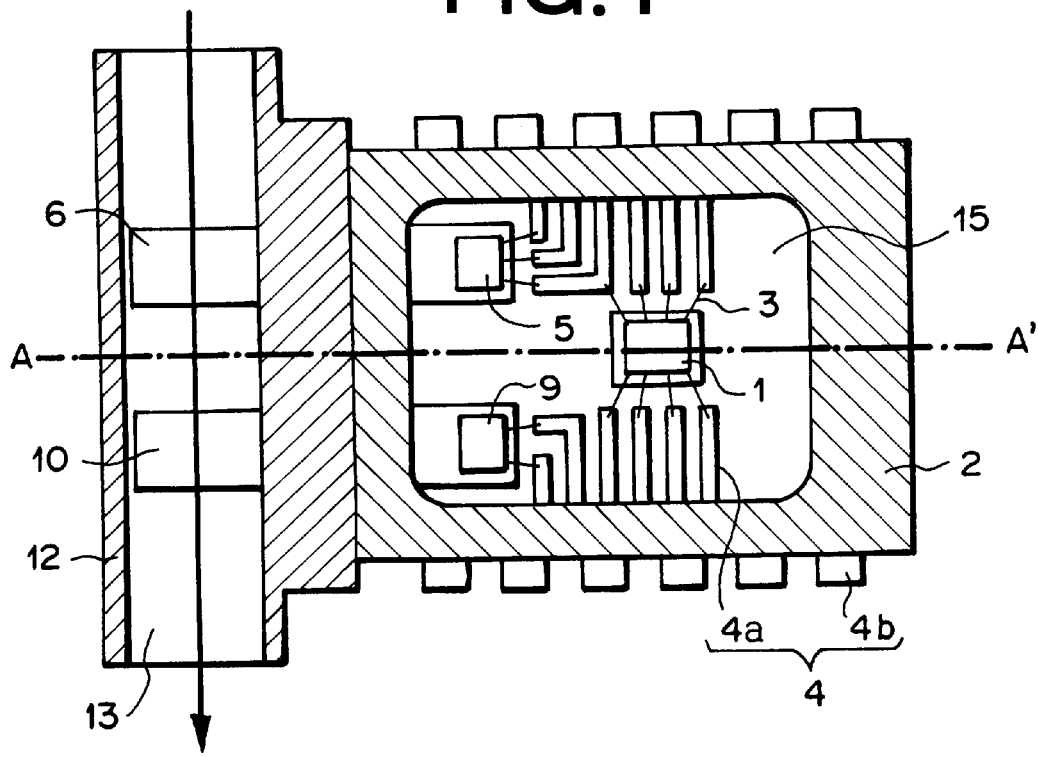
FIG. 1 is a schematic cross-sectional view showing a flow rate sensor unit according to the present invention.
Figure 2:
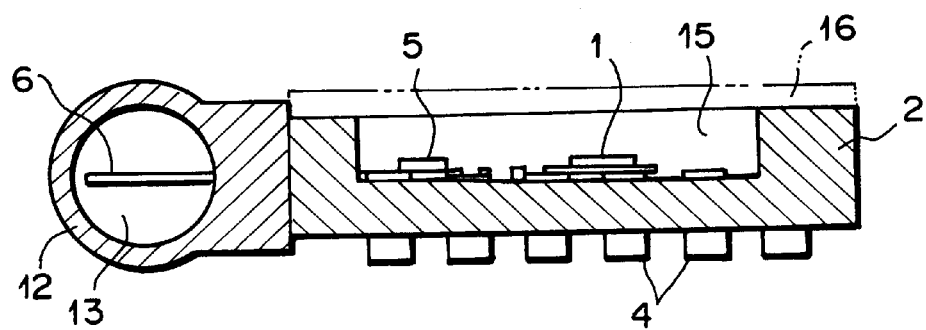
FIG. 2 is a cross-sectional view taken along A—A' of FIG. 1.

FIG. 1 is a schematic cross-sectional view showing an embodiment of a flow rate sensor unit according to the present invention, and FIG. 2 is a cross-sectional view taken along A—A' of FIG. 1.

As is shown in FIGS. 1 and 2, a flow rate detector 5 is joined on the surface of a fin plate 6 serving as a flow rate detecting thermal conductor, and a fluid temperature detector 9 is joined on the surface of a fin plate 10 serving as a fluid temperature detecting thermal conductor. The flow rate detector 5, the fluid temperature detector 9 and a part of each of the fin plates 6, 10 are accommodated in a housing 2.

Figure 3:
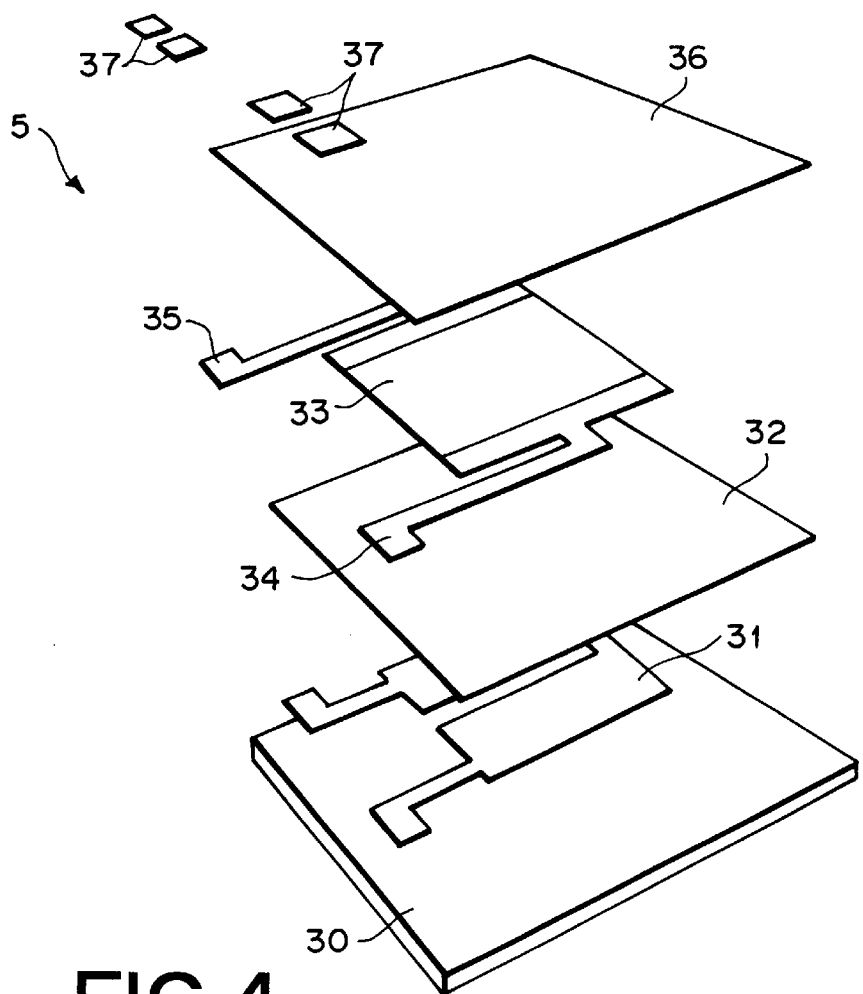
FIG. 3 is an exploded perspective view showing the construction of a flow rate detector.

As shown in FIG. 3, the flow rate detector 5 is designed in the form of a chip by laminating a flow rate detecting thin film temperature sensor 31, an interlayer insulating film 32, a thin film heater 33, electrodes 34, 35 for the heater and a protection film 36 in this order on a rectangular substrate 30 of about 0.4 mm in thickness and about 2 mm in square which is formed of silicon or alumina, for example, and then forming a pad layer 37 coated on the bonding portion of the flow rate detecting thin film temperature sensor 31 and the heater electrodes 34, 35.

The thin film temperature sensor 31 may be a metal resistance film of platinum (Pt) or nickel (Ni) having a large and stable temperature coefficient which is patterned in a desired form, for example in a meandering form so as to have a film thickness of about 0.5 to 1$\mu$m. Alternatively, it may be an NTC thermistor of manganese oxide group. The interlayer insulating film 32 and the protection film 36 may be formed of $SiO_2$ at a thickness of about 1$\mu$m, for example. The thin film heater 33 may comprise a resistor of Ni, Ni—Cr, Pt, or cermet such as Ta—$SiO_2$, Nb—$SiO_2$ or the like, which is patterned to have a desired shape and a film thickness of about 1$\mu$m. The heater electrodes 34, 35 may be formed of an Ni layer having a thickness of about 1$\mu$m or a laminate of the Ni layer and a gold (Au) layer of 0.5$\mu$m laminated thereon. The pad layer 37 may be formed of an Au thin film or Pt thin film having a thickness of about 0.1 $\mu$m and a size of 0.2 mm×0.15 mm in longitudinal and lateral directions.

Figure 4:
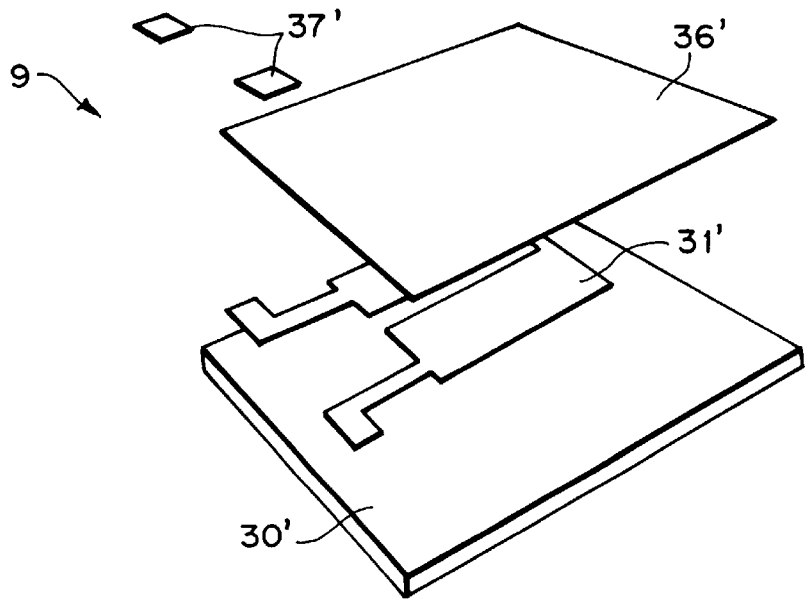
FIG. 4 is an exploded perspective view showing the construction of a fluid temperature detector.

As shown in FIG. 4 the fluid temperature detector 9 has the same construction as the flow rate detector 5 except that the thin film heater 33, etc. are removed from the flow rate detector 5, that is, it is designed in a chip form by laminating a fluid temperature detecting thin film temperature sensor 31' having the same construction as the thin film temperature sensor 31 and a protection film 36' having the same construction as the protection film 36 in this order on a substrate 30' having the same construction as the substrate 30, and then forming a pad layer 37' so as to cover the bonding portion of the fluid temperature detecting thin film temperature sensor 31'.

One surfaces of one end portions of the fin plates 6, 10 are joined to the surfaces of the substrates 30, 30' of the flow rate detector and the fluid temperature detector 9 by joint material having excellent thermal conductivity. The fin plate 6, 10 may be a rectangular plate of about 0.2 mm in thickness and about 2 mm in width, which is formed of, copper, duralumin, copper-tungsten alloy or the like. Silver paste may be used as the joint material.

As shown in FIGS. 1 and 2, a fluid channel member 12 is connected to the housing 2 of a sensor unit, and the other end portions of the fin plates 6, 10 extend into a fluid channel 13 formed in the fluid channel member 12. The fin plates 6, 10 extend in the fluid channel 13 having the substantially circular cross-section so as to pass through the center of the cross-section of the fluid channel 13. The fin plates 6, 10 are disposed along the fluid flowing direction (indicated by an arrow of FIG. 1) in the fluid channel 13. Therefore, they can excellently perform thermal transfer (thermal conduction) between the fluid and each of the flow rate detector 5 and the fluid temperature detector 9 without significantly disturbing the flow of fluid in the fluid channel 13.

The housing 2 and the fluid channel member 12 may be formed of synthetic resin such as epoxy resin, polyphenylene sulfide resin or the like. A chip-shaped semiconductor memory 1 for storing individual information of the sensor unit is accommodated in the housing 2. The individual information stored in the memory 1 will be described later.

Each electrode terminal (pad) of the flow rate detector 5, the fluid temperature detector 9 and the memory 1 is connected to the inner lead portion (each portion in the housing) 4a of each lead 4 by an Au wire 3. Each lead 4 extends to the outside of the housing 2 and is partially exposed to the outside of the housing to thereby form an outer lead portion 4b. The outer lead portion 4b may be of a J-bent type, for example.

In FIGS. 1 and 2, a space 15 is formed at the center portion of the housing 2, and the detectors 5, 9, parts of the fin plates 6, 10 and the inner lead portions 4a are located in the space 15. Actually, as shown in FIG. 2, the space 15 is covered by a cover 16 which is formed integrally with the housing 2, or sealed with synthetic resin so that it is integrated with the housing 2.

Figure 5:
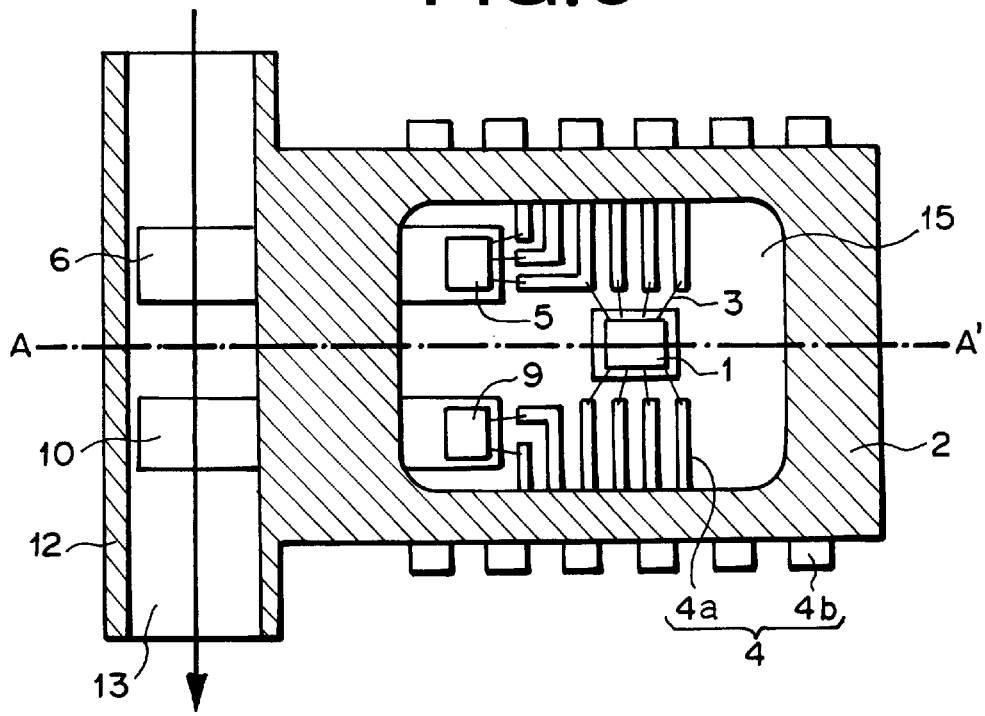
FIG. 5 is a schematic cross-sectional view showing a flow rate sensor unit according to the present invention.
Figure 6:
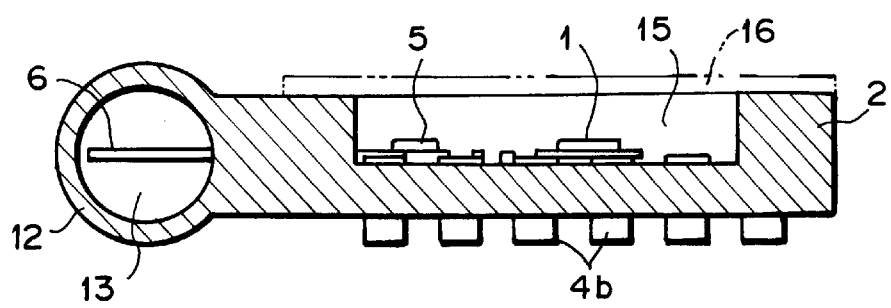
FIG. 6 is a cross-sectional view taken along A—A' of FIG. 5.

A modification of the flow rate sensor unit thus constructed will be described with reference to FIGS. 5 and 6. In FIGS. 5 and 6, the members and portions having the same functions as those of FIGS. 1 and 2 are represented by the same reference numerals. This modification is different from the construction shown in FIGS. 1 and 2 only in that the housing 2 is formed integrally with the fluid channel member 12 in the same molding process.

Figure 7:
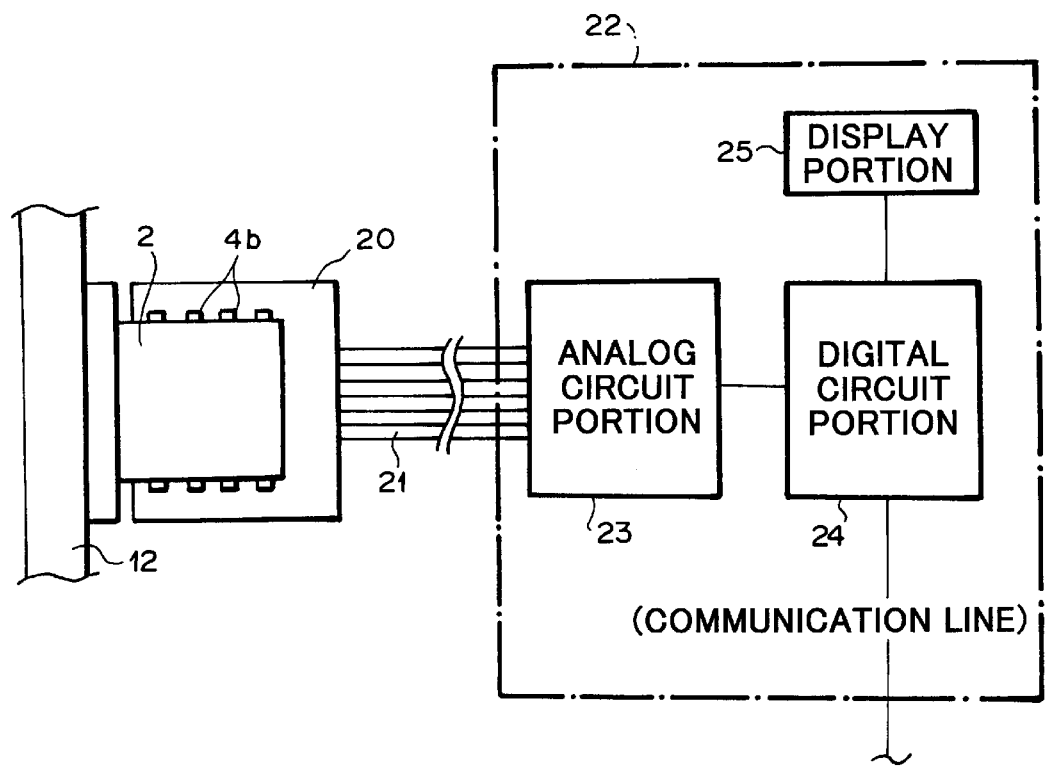
FIG. 7 is a schematic diagram showing a flowmeter of the present invention.

Next, FIG. 7 shows an embodiment of a flowmeter using the flow sensor unit as described above.

A socket 20 is fitted to the outer lead portions 4b exposed to the outside of the housing 2 of the sensor unit, and wires 21 are connected to the socket 20. Each of the wires is electrically connected to each outer lead portion 4b at one end thereof, and also connected to an electrical circuit portion 22 at the other end thereof. The electrical circuit portion 22 has an analog circuit portion 23, a digital circuit portion 24 and a display portion 25, the wires 21 are connected to the analog circuit portion 23, and the output of the analog circuit portion 23 is input to the digital circuit portion 24. The digital circuit portion 24 is connected to the display portion 25 and a communication line for communications with the external.

Figure 8:
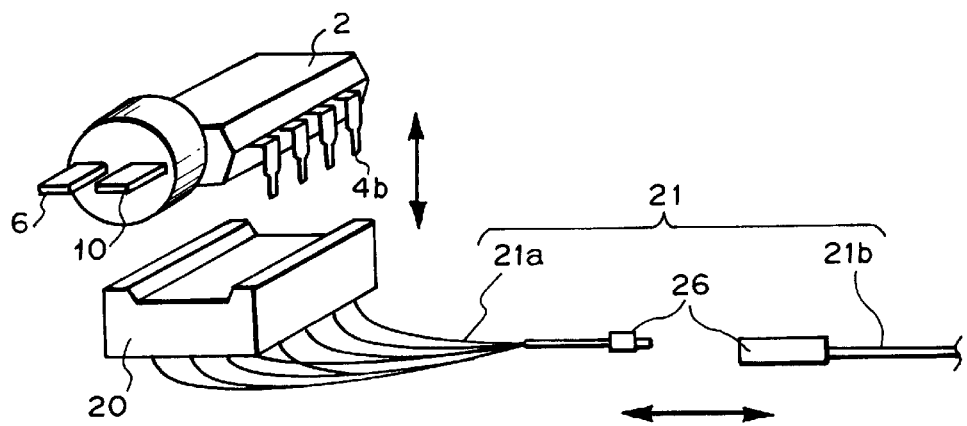
FIG. 8 is a diagram showing an example of the connection between a flow rate sensor unit and an electrical circuit portion of the flowmeter according to the present invention.

FIG. 8 shows a modification of the connection between the flow rate sensor unit as described above and the electrical circuit portion. In this modification, a modular jack 26 is interposed at some midpoint of the wires 21, and the wires 21 can be separated into the sensor unit side wiring portion 21a and the electrical circuit side wiring portion 21b by the modular jack 26. Accordingly, the wiring portion 21a, the socket 20 and the flow rate sensor unit secured to the socket can be removed from the wiring portion 21b by the modular jack 26 while keeping the connection between the housing 2 and the socket 20. Accordingly, the wiring portion 21a and the socket 20 can be discarded together with the flow rate sensor unit. This construction increases the number of parts to be thrown away, however, there is avoided the variation imposed on the extension state of the fin plates 6, 10 into the fluid channel in such a case that the housing 2 is mounted onto the socket 20, and thus the attaching/detaching operation can be easily performed.

Figure 9:
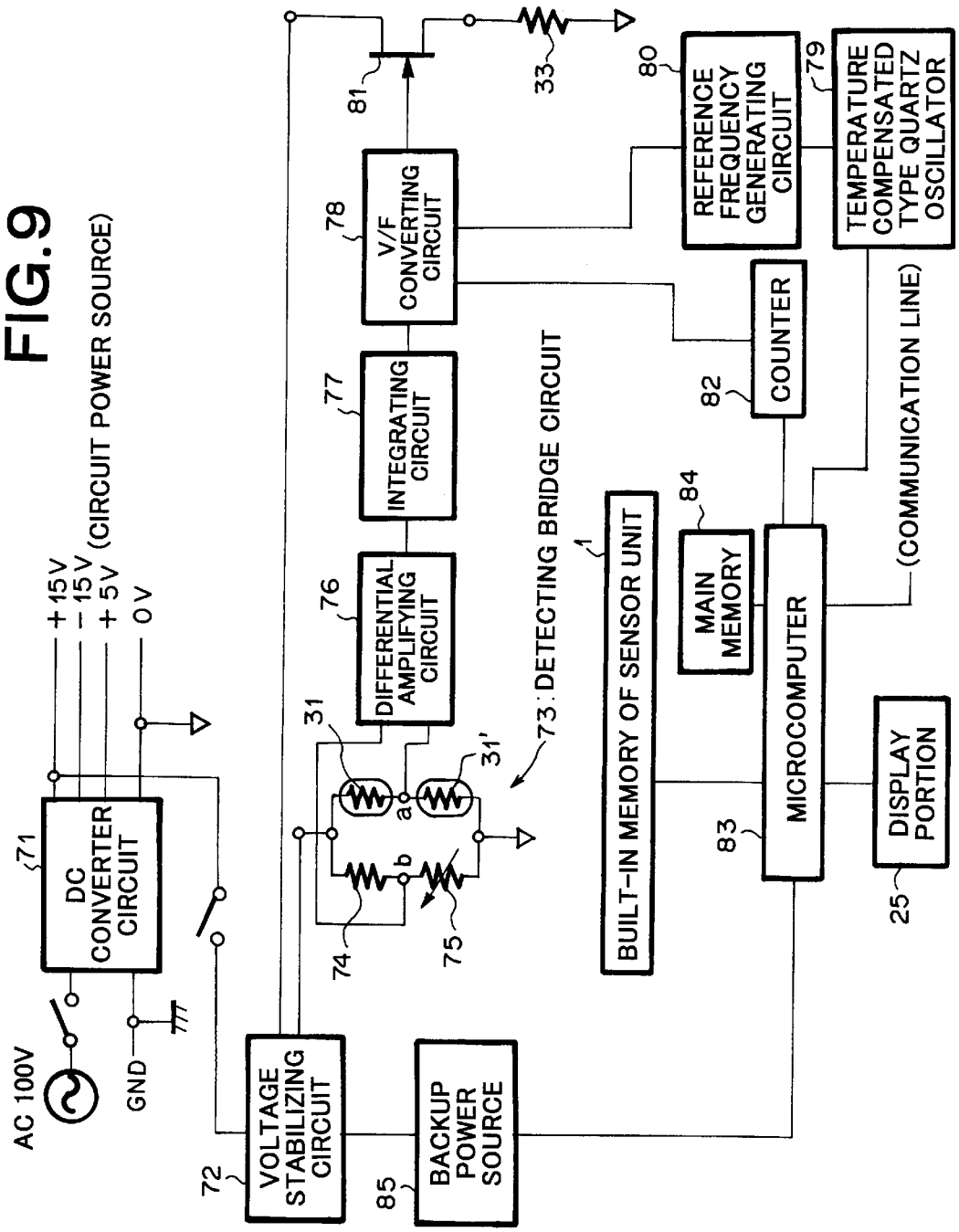
FIG. 9 is a circuit diagram showing the flowmeter according to the present invention.

FIG. 9 is a circuit diagram of the above flowmeter.

AC 100V is used as a power supply source, and DC voltages of +15V, −15V, +5V generated from AC 100V are output by a DC converting circuit 71. The DC voltage of +15V output from the DC converting circuit 71 is input to a voltage stabilizing circuit 72.

The stabilized DC voltage supplied from the voltage stabilizing circuit 72 is supplied to a bridge circuit (detection circuit) 73. The bridge circuit 73 comprises a flow rate detecting temperature sensor 31, a temperature compensating temperature sensor 31', a resistor 74 and a variable resistor 75. The potentials Va, Vb at a, b points of the bridge circuit 73 are input to a differential amplifying circuit 76 having variable amplification factor. The output of the differential amplifying circuit 76 is input to an integrating circuit 77.

The output of the voltage stabilizing circuit 72 is supplied to a thin film heater 33 through an electric field effect transistor 81 for controlling the current supplied to the thin film heater 33. That is, in the flow rate detector 5, on the basis of the heating of the thin film heater 33, the temperature sensing operation of the thin film temperature sensor 31 is carried out while suffering an effect of endothermic action of fluid to be examined through the fin plate 6. As a result of the temperature sensing, the difference between the potentials Va, Vb at the a, b points of the bridge circuit 73 shown in FIG. 9 is achieved.

The temperature of the flow rate detecting temperature sensor 31 is varied in accordance with the flow rate of fluid, and the variation of the temperature of the flow rate detecting temperature sensor 31 causes variation of the value (Va−Vb). By setting the resistance value of the variable resistor 75 to a proper value in advance, the value of (Va−Vb) can be set to zero when the flow rate of the fluid is equal to a desired value (reference value). At this reference flow rate, the output of the differential amplifying circuit 76 is equal to zero, and the output of the integrating circuit 77 is equal to a fixed value (the value corresponding to the reference flow rate). The output of the integrating circuit 77 is subjected to level adjustment so that the minimum value is equal to 0V.

The output of the integrating circuit 77 is input to a V/F converting circuit 78, in which a pulse signal having the frequency (for example, 5×10$^{-5}$ at maximum) corresponding to a voltage signal is formed. The pulse signal has a fixed pulse width (time interval) (for example, a desired value in the range from 1 to 10 μsec). For example, when the output of the integrating circuit 77 is equal to 1V, a pulse signal having a frequency of 0.5 kHz is output, and when the output of the integrating circuit 77 is equal to 4V, a pulse signal having a frequency of 2 kHz is output.

The output of the V/F converting circuit 77 is supplied to the gate of the transistor 81. Current flows into the thin film heater 33 through the transistor whose gate is supplied with the pulse signal. Accordingly, a divided voltage of the output voltage of the voltage stabilizing circuit 72 is applied to the thin film heater 33 through the transistor at the frequency corresponding to the output value of the integrating circuit 77 and in the pulse form, whereby current intermittently flows into the thin film heater 33 to heat the thin film heater 33. The frequency of the V/F converting circuit 77 is set on the basis of a high-precision clock which is set on the basis of oscillation of a temperature compensated type quartz oscillator 79 in a reference frequency generating circuit 80.

The analog circuit portion 23 is constructed to contain the above elements.

The pulse signal output from the V/F converting circuit 77 is counted by a pulse counter 82. On the basis of the result (pulse frequency) of the pulse counting which is carried out on the basis of the frequency generated in the reference frequency generating circuit 80, a microcomputer 83 converts the result to the corresponding flow rate (instantaneous flow rate), and integrates the flow rate thus achieved with respect to time to thereby calculate an integrated flow rate.

Figure 10:
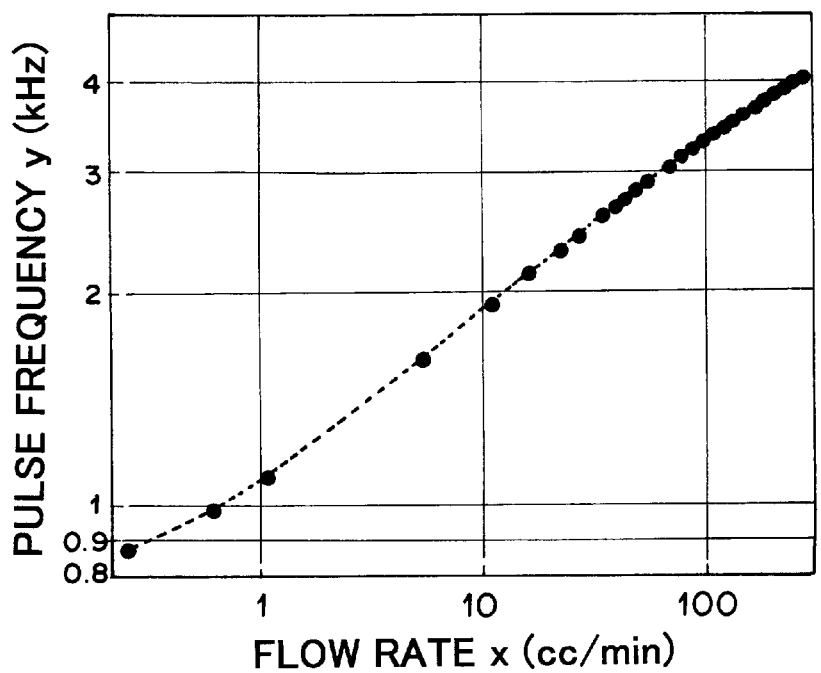
FIG. 10 is a diagram showing an example of a calibration curve in the flowmeter of the present invention.

The conversion to the flow rate is carried out by using a standard calibration curve stored in the main memory 84 in advance. FIG. 10 shows an example of the calibration curve. That is, a data table achieved by measuring the pulse frequency output from the pulse counter 82 every flow rate of fluid by using a flow rate sensor unit as a reference sensor unit is stored as a standard calibration curve in the main memory 84.

In this embodiment, individual information of a sensor unit for flow rate measurements is stored in the memory 1 of the sensor unit concerned. The individual information is data indicating plural corresponding relationships between the true flow rate value and the output pulse frequency of the pulse counter 82 achieved in advance by actually measuring the flow rate with the sensor unit concerned.

Figure 11:
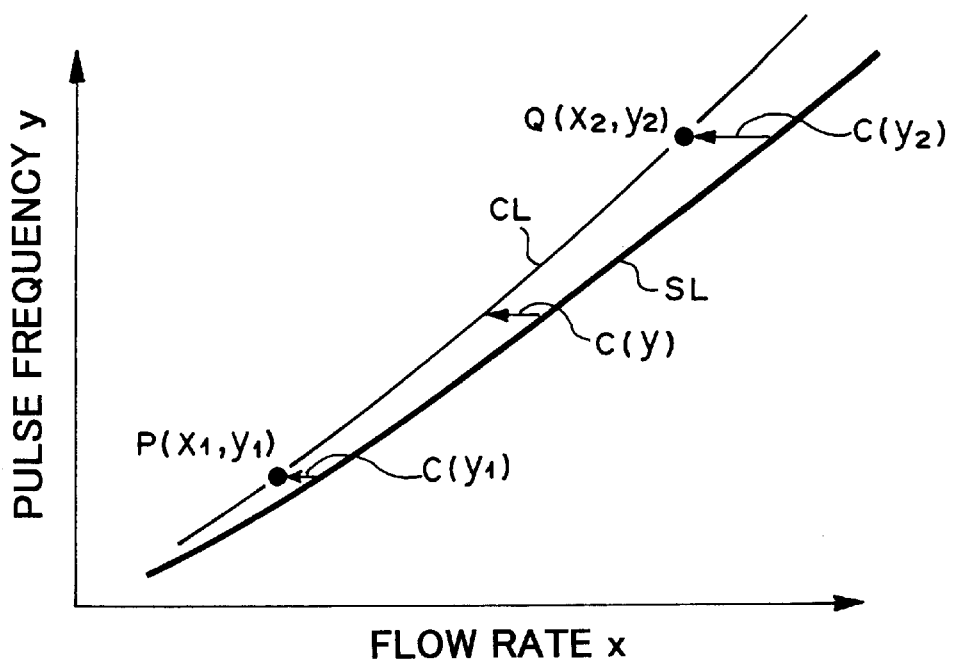
FIG. 11 is a diagram showings standard calibration curve and a corrected calibration curve in the flowmeter of the present invention.

The individual information will be described with reference to FIG. 11. A standard calibration curve SL is shown in FIG. 11. The standard calibration curve SL shows the relationship between a flow rate value x and a pulse frequency value y. The relationship of (flow rate value–pulse frequency value) at points P, Q in FIG. 11, that is, $P(x_1, Y_1)$ and $Q(x_2, Y_2)$ are stored in the built-in memory 1 of the sensor unit.

The data storage into the memory 1 as described above may be carried out as follows. That is, EEPROM is used as the memory 1, under the existence of the space 15 as shown in FIGS. 1 and 2 (that is, before the resin sealing and provision of the cover 16), fluid is made flow at flow rate values of $x_1$ and $x_2$ to measure the output pulse frequency values $y_1$ and $Y_2$, and these measurement values are written into EEPROM by laser irradiation. After the individual information is stored into the memory 1 as described above, the space 15 is sealed with resin or the cover 16 is mounted on the space 15, thereby completing the sensor unit. With this process, the sensor unit containing the memory 1 can be manufactured in low cost. The memory 1 of the present invention is not limited to EEPROM, and different kinds of writable memories may be used.

In the microcomputer 83, when the flow rate of fluid to be examined is measured, the standard calibration curve is first corrected on the basis of the individual information as described above to create a corrected calibration curve. That is, a corrected calibration curve CL passing through $(x_1, y_1)$ and $(x_1, Y_2)$ is achieved on the basis of the standard calibration curve SL as shown in FIG. 11 and the individual information $P(x_1, y_1)$ and $Q(x_2, Y_2)$. Specifically, when the pulse frequency value is equal to $y_1$, the corrected flow rate value is set to the sum of the flow rate value x and the correction value [containing sign] $C(y_1)$, i.e., $[x+C(y_1)]$. When the pulse frequency value is equal to $y_2$, the corrected flow rate value is set to the sum of the flow rate value x and the correction value [containing sign] $C(y_2)$, that is, $[x+C(y_2)]$. In the case of the other pulse frequency values y, the correction value $C(y)$ may be set by the extrapolating or interpolating method, for example. At this time, a function form of $y=f(x)$ for the standard calibration curve SL is considered, and the extrapolation or interpolation is carried out so that the displacement from this function form is as less as possible.

In the foregoing description, the individual information comprises two points $P(x_1, y_1)$ and $Q(x_2, Y_2)$, however, the corrected calibration curve CL can be further easily achieved by setting the individual information to three or more points.

As described above, the microcomputer 83 specifies as a measurement value the corrected flow rate value on the corrected calibration curve CL corresponding to the pulse frequency output from the pulse counter 82 when the flow rate measurement is carried out (the reference flow rate value may be achieved by using the standard calibration curve and then added with the correction value $C(y)$ as described above).

The digital circuit portion 30 is constructed by containing the above elements.

The values of the instantaneous flow rate and the integrated flow rate thus achieved are displayed on the display portion 25, and also transmitted to the external through a communication line such as a telephone line or other network. If necessary, the data of the instantaneous flow rate and the integrated flow rate may be stored in the main memory 84.

Reference numeral 85 represents a backup power source (for example, battery).

If the flow rate increases/decreases, the polarity (which is different in accordance with the positive/negative sign of the resistance-temperature characteristic of the flow rate detecting temperature sensor 31) and magnitude of the output of the differential amplifying circuit 76 is varied in accordance with the value of (Va–Vb), and the output of the integrating circuit 77 is also varied in accordance with the above variation. The variation velocity of the output of the integrating circuit 77 may be adjusted by setting the amplification factor of the differential amplifying circuit 76. The response characteristic of the control system is set by the integrating circuit 77 and the differential amplifying circuit 76.

When the flow rate of fluid is increased, the temperature of the flow rate detecting temperature sensor 31 is reduced. Therefore, such an output (a higher voltage value) of the integrating circuit 77 as increases the heating value of the thin film heater 33 (that is, increases the pulse frequency) is achieved, and the bridge circuit 73 is set to an equilibrium state at the time point when the output of the integrating circuit is equal to the voltage corresponding to the flow rate of the fluid.

On the other hand, when the fluid flow rate is reduced, the temperature of the flow rate detecting temperature sensor 31 increases, so that such an output (a lower voltage value) of the integrating circuit 77 as reduces the heating value of the thin film heater 33 (that is, reduces the pulse frequency) is achieved, and the bridge circuit 73 is set to the equilibrium state at the time point when the output of the integrating circuit is equal to the voltage corresponding to the fluid flow rate.

That is, in the control system of this embodiment, the frequency of the pulse-shaped current (corresponding to the heating value) to be supplied to the thin film heater 33 is set so that the bridge circuit 73 is set to the equilibrium state, and such an equilibrium state as described above (response of the control system) can be realized within 0.1 second, for example.

In the above-described embodiment, the standard calibration curve is corrected on the basis of the individual information of a newly used flow rate sensor unit. Therefore, even when the joint state between the chip of each of the flow rate detector 5 and the fluid temperature detector 9 and the corresponding thermal conductor, the wire bonding connection state between the chip of each of the flow rate detector 5 and the fluid temperature detector 9 and the leads, etc. are different among individual flow rate sensor, the flow rate measurement can be performed with high precision by each flow rate sensor unit. Accordingly, even when the electrical circuit portion of the flowmeter is continuously used and the flow rate sensor unit is thrown away, the high measurement precision can be kept, and the field to which the flow rate measurement is applied can be enlarged.

Further, according to the above-described embodiment, the pulse signal generated by the V/F converting circuit 78 is used, and the error due to temperature variation can be sufficiently reduced for the pulse signal, and thus the error of the flow rate value and the integrated flow rate value achieved on the basis of the pulse frequency can be reduced. In addition, according to this embodiment, the control of current to be supplied to the thin film heater 33 is carried out on the basis of the ON-OFF operation based on the pulse signal generated in the V/F converting circuit 78, so that a control error due to temperature variation occurs with extremely small probability.

Still further, according to this embodiment, a minute chip containing a thin film heater and a thin film temperature sensor is used as a flow rate detector, so that high-speed response can be implemented and the precision of the flow rate measurement can be enhanced.

Still further, according to this embodiment, irrespective of the flow rate of the fluid to be examined, the temperature of the flow rate detecting temperature sensor 31 around the thin film heater 33 is set to a substantially constant value, so that deterioration of the flow rate sensor unit with time can be suppressed and occurrence of ignition explosion of combustible fluid to be examined can be prevented.

Figure 12:
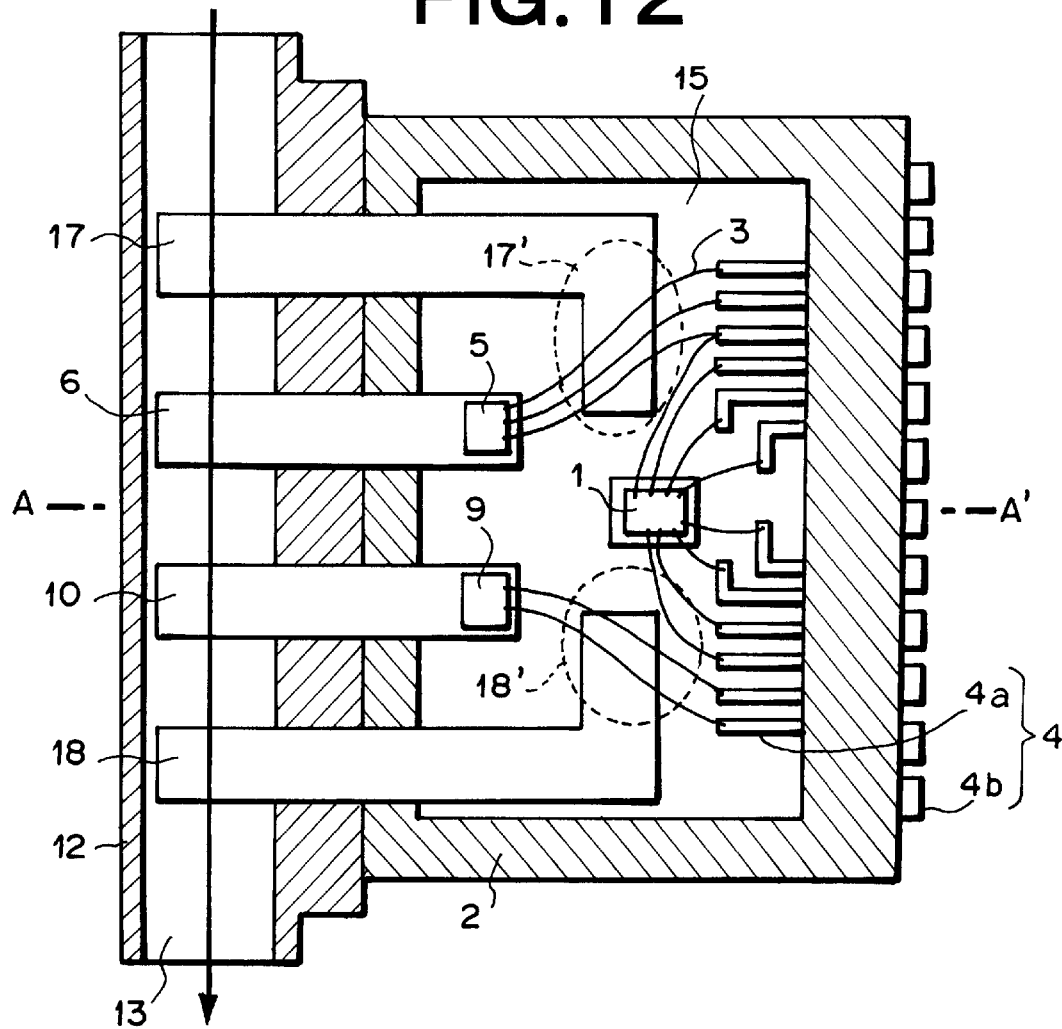
FIG. 12 is a schematic cross-sectional view showing a flow rate sensor unit according to the present invention.
Figure 13:
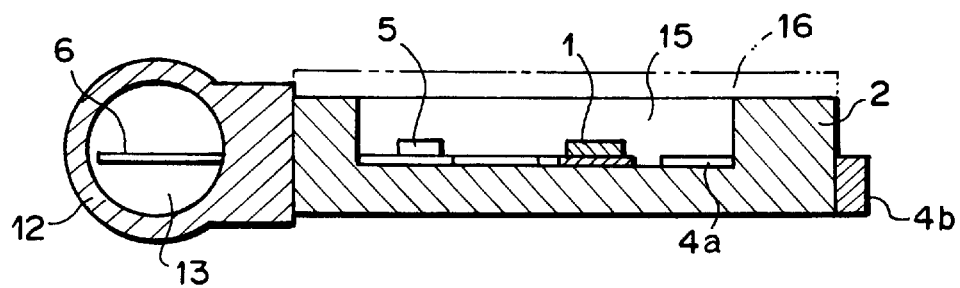
FIG. 13 is a cross-sectional view taken along A—A' of FIG. 12.

FIG. 12 is a schematic cross-sectional view showing an embodiment of a flow rate sensor unit according to the present invention, and FIG. 13 is a cross-sectional view taken along A—A' of FIG. 12. In FIGS. 12 and 13, the members and portions having the same functions as those of FIGS. 1 and 2 are represented by the same reference numerals. This embodiment is substantially different from the embodiment of FIGS. 1 and 2 in that fin plates 17, 18 serving as a thermal conductor are disposed. The fin plates 17, 18 are partially accommodated in the housing 2. The flow rate detector 5 is designed in the form of a chip as shown in FIG. 3. The fluid temperature detector 9 is designed in the form of a chip as shown in FIG. 4.

As shown in FIGS. 1 and 2, the fluid channel member 12 is connected to the housing 2 of the sensor unit, and the end portions of the fin plates 6, 10, 17, 18 extend to the inside of the fluid channel 13 formed in the fluid channel member 12. The fin plates 6, 10, 17, 18 extend in the fluid channel 13 having a substantially circular cross-section so as to pass the center of the cross-section of the fluid channel 13. Since the fin plates 6, 10, 17, 18 are arranged along the fluid flowing direction (indicated by an arrow of FIG. 12) in the fluid channel 13, the thermal conduction through the fin plates 6, 10 between each of the flow rate detector 5 and the fluid temperature detector 9 and the fluid and the thermal conduction through the fin plates 17, 18 between the inside of the housing and the fluid can be excellently performed.

The fin plates 17, 18 may be formed of the same material as the fin plates 6, 10, and the fin plates 17, 18 can be formed together with the fin plates 6, 10 and the leads 4 by patterning a plate-shaped member. The fin plate 17 is formed so as to extend to the gap between the inner lead portion 4a and the flow rate detector 5 in the housing 2, that is, it extends to a position nearer to the inner lead portion 4a than the flow rate detector 5. Likewise, the fin plate 18 is formed so as to extend to the gap between the inner lead portion 4a and the fluid temperature detector 9 in the housing 2, that is, it extends to a position nearer to the inner lead portion 4a than the fluid temperature detector 9.

The wires 3 are arranged so as to stride over the end portions of the fin plates 17, 18 in the housing, so that insulating films 17', 18' can be formed on the end portions of the fin plates 17, 18 to avoid the contact between the wires 3 and the fin plates 17, 18. However, when the wires 3 are formed so as to extinguish the probability that the wires 3 come into contact with the fin plates 17, 18, the insulating films 17', 18' may be omitted.

By arranging the fin plates 17, 18, the thermal conduction between the fluid flowing in the fluid channel 13 and the inside of the housing 2 (particularly, the areas between the inner lead portion 4a and the flow rate detector 5 and between the inner lead portion 4a and the fluid temperature detector 9) can be excellently performed, and even when heat flow occurs between the inside and the outside of the housing 2 through the leads 4, the flow rate detector 5 and the fluid temperature detector 9 can be effectively prevented from being influenced by the heat flow. Particularly, heat flowing into the housing 2 through the leads 4 can be effectively leaked to the fluid in the fluid channel 13.

Figure 14:
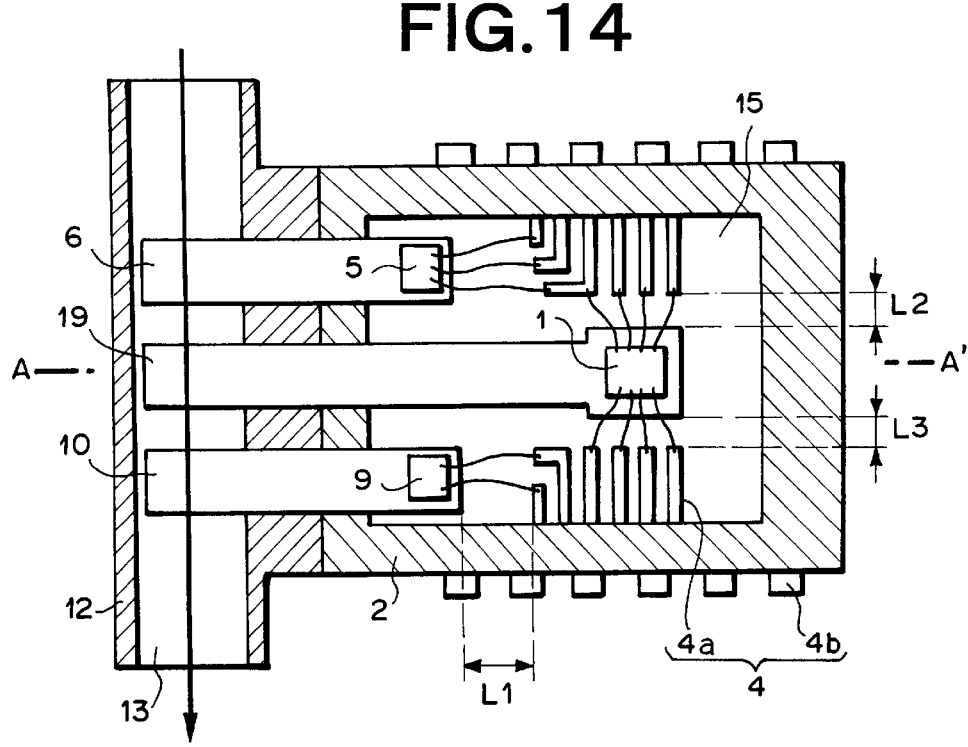
FIG. 14 is a schematic cross-sectional view showing a flow rate sensor unit according to the present invention.
Figure 15:
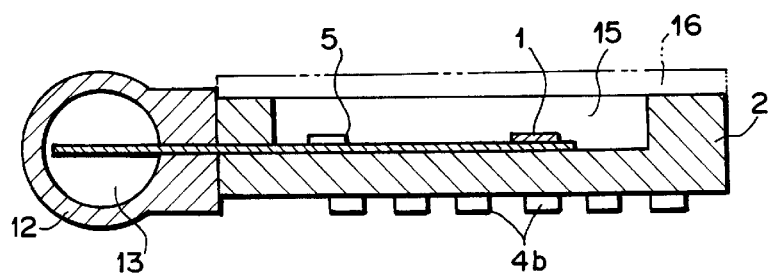
FIG. 15 is a cross-sectional view taken along A—A' of FIG. 14.

A modification of the flow rate sensor unit as described above is shown in FIGS. 14 and 15. In FIGS. 14 and 15, the members and portions having the same functions as those of FIGS. 12 and 13 are represented by the same reference numerals. In this modification, the fin plate 19 serving as a thermal conductor is disposed at the intermediate position between the fin plates 6, 10. The memory 1 is connected to the end portion of the fin plate 19 located in the housing.

The inner lead portion 4a is located at a distance of L1 from the end portions of the fin plates 6, 10 located in the housing, and the distance L2, L3 between the inner lead portion 4a and the end portion of the fin plate 19 located in the housing is set to a distance smaller than L1. For example, the distance L1 is set to 3mm or more, and the distances L2, L3 are set to a value less than 3mm.

By disposing the fin plate 19, the thermal conduction between the fluid flowing in the fluid channel 13 and the inside of the housing 2 (particularly, an area in the neighborhood of the inner lead portion 4a) is excellently performed, and even when heat flow occurs between the inside and the outside of the housing 2 through the leads 4, the flow rate detector 5 and the fluid temperature detector 9 can be effectively prevented from being influenced by the heat flow.

In the embodiment and the modification described above, the housing 2 and the fluid channel member 12 can be integrally formed with each other in the same molding process.

Figure 16:
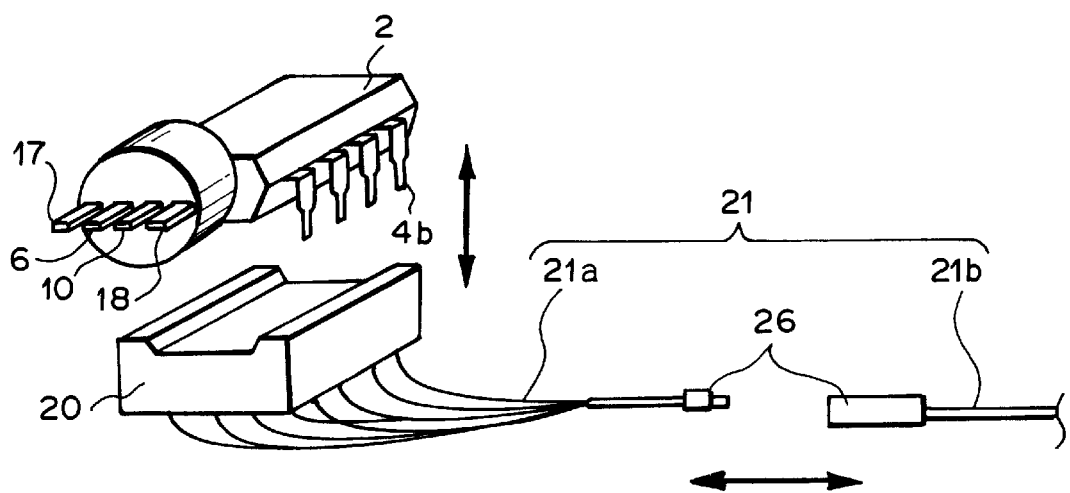
FIG. 16 is a diagram showing an example of the connection between the flow rate sensor unit and the electrical circuit portion in the flowmeter of the present invention.

A flowmeter can be constructed by using the flow rate sensor unit as described above in the same manner as described with reference to FIG. 7. FIG. 16 shows a modification of the connection between the flow rate sensor unit as described above and the electrical circuit portion. This modification has the same connection as shown in FIG. 8 except that the flow rate sensor unit having the fin plates 17, 18 is used. This arrangement can suppress variation imposed on the extension state of the fin plates 6, 10, 17, 18 in the fluid channel in such a case that the housing 2 is mounted onto the socket 20, so that the attaching/detaching operation can be easily performed.

The circuit construction of the flowmeter as described above is the same as described with reference to FIG. 9. The standard calibration curve which is used for the conversion to the flow rate in the flowmeter and stored in the main memory 84 in advance is the same as described with reference to FIG. 10. Further, the recording operation of the individual information of the sensor unit into the memory 1 of the sensor unit concerned and the flow rate measuring process of the fluid to be examined which is carried out in the microcomputer 83 by using the individual information are the same as described on the embodiment of FIGS. 1 and 2 with reference to FIG. 11.

Next, an embodiment of a flow rate sensor according to the present invention will be described.

Figure 17:
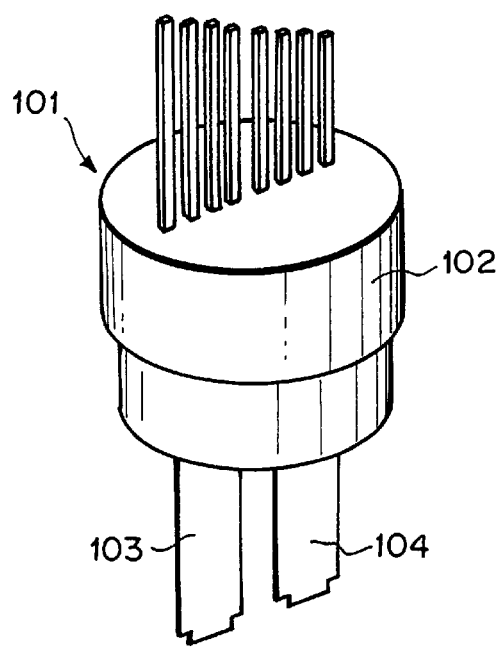
FIG. 17 is a perspective view showing an embodiment of a flow rate sensor of the present invention.

FIG. 17 is a perspective view showing an embodiment of a flow rate sensor according to the present invention. FIG. 18A is a longitudinally-sectional view showing the flow rate sensor of FIG. 17, and FIG. 18B is a longitudinally-sectional view taken along X—X line of FIG. 18A.

As shown in FIGS. 17, 18A and 18B, a flow rate sensor 101 comprises a housing 102, a flow rate measuring portion 103 and a temperature compensating measuring portion 104.

As shown in FIGS. 18A and 18B, the flow rate measuring portion 103 comprises a flow rate detector 105 mounted in the housing 102, a fin plate 106 which is joined to the flow rate detector 105 at one end thereof and extends to the outside of the housing 102 at the other end thereof, and bonding wires 108 for electrically connecting the flow rate detector 105 to output terminals 107 each of which is joined to each bonding wire 108 at one end thereof and extends to the outside of the housing 102 at the other end thereof.

The temperature compensating measuring portion 104 comprises a temperature detector 109 mounted in the housing 102, a fin plate 110 which is joined to the flow rate detector 109 at one end thereof and extends to the outside of the housing 102 at the other end thereof; and bonding wires 112 for electrically connecting the temperature detector 109 to output terminals Ill each of which is joined to each bonding wire 112 at one end thereof and extends to the outside of the housing 102 at the other end thereof.

The flow rate sensor shown in FIGS. 18A and 18B has such a structure that no cavity portion is provided in the housing 102 and the surrounding portion of the flow rate detector 105 and the temperature detector 109 are filled with resin. In this case, in order to suppress the thermal transfer between each part of the flow rate sensor and a casing serving as a peripheral structure of the flow rate sensor at maximum, it is necessary to use synthetic resin having small thermal conductivity as the material of the housing 102. Specifically, if the thermal conductivity is set to 0.7 W/m·K or less, preferably 0.4 W/m·K or less, the heat conduction amount in the housing 102 can be reduced and thus the flow rate can be measured with high precision.

FIGS. 19A and 19B show another embodiment of the flow rate sensor of the present invention. In this embodiment, a cavity portion is provided in the housing. FIG. 19A is a longitudinally-sectional view of the flow rate sensor, and FIG. 19B is a longitudinally-sectional view taken along X—X line of FIG. 19A.

In FIGS. 19A and 19B, the flow rate sensor 121 is disposed in the cavity portion 123 of the housing 122 so that both of the flow rate detector 105 of the flow rate measuring portion 103 and the temperature detector 109 of the temperature compensating measuring portion 104 are not brought into contact with the resin forming the housing 122. The output terminals 107, 111 are fixed to the wall of the housing 122.

By providing the cavity portion 123 in the housing 122 as shown in FIGS. 19A and 19B, even when the thermal conductivity of the resin forming the housing 122 is relatively large, the thermal transfer between each part of the flow rate sensor and the structure (casing) surrounding the flow rate sensor can be suppressed at maximum by the adiabatic effect of the cavity portion 123.

If a notch portion is formed on the outer peripheral surface of the flow rate sensor so that an adiabatic gap occurs between the flow rate sensor and the casing, heat transfer between the flow rate sensor and the casing can be effectively suppressed.

Next, each part of the flow rate sensor will be described (see FIGS. 18A and 18B).

The housing 102 is preferably formed of rigid resin having high chemical resistance and high oil resistance, and more preferably formed of resin having low thermal conductivity such as epoxy resin, polybutylene terephthalate (PBT), polyphenylene sulfide (PPS) or the like.

The output terminals 107, 111 are linear thin plates of about 200 $\mu$m in thickness which are formed of material having high conductivity such as copper or the like.

It is preferable that the output terminals 107, 111 are juxtaposed with one another on a line so as to project to the outside of the resin housing 102 and so that the projection length thereof from the resin housing 102 is gradually increased (reduced) from one end of the linear line to the other end thereof. This construction facilitates the mounting work of a sensor press plate for pressing the flow rate sensor 101 from the upper side and a flow rate detecting circuit board which is connected to the output terminals 107, 111 to form a circuit, and also reduces such a risk that the flow rate sensor 101 is damaged when the sensor press plate or the flow rate detecting circuit board is mounted.

The end portions of the output terminals 107, 111 located in the housing are assembled so as to be proximate to one another, thereby facilitating the work of connecting the bonding wires 108, 112 to the output terminals 107, 111, the flow rate detector 105 and the temperature detector 109.

Each of the fin plates 106, 110 comprises a rectangular thin plate of about 200 μm in thickness and about 2mm in width which is formed of material having high thermal conductivity such as copper, duralumin, copper-tungsten alloy or the like. The fin plates 106, 110 are fixed to the flow rate detector 105 and the temperature detector 109 through joint material such as silver paste or the like.

The flow rate detector 105 has the same construction as the flow rate detector 5 described above with reference to FIG. 3. The temperature compensating measuring portion 104 has the same construction as the fluid temperature detector 9 described above with reference to FIG. 4

Various methods may be used to manufacture the flow rate sensor 101, however, the fin plate 106 and the output terminals 107, and the fin plate 110 and the output terminals 111 may be respectively formed from a single body.

Figure 20:
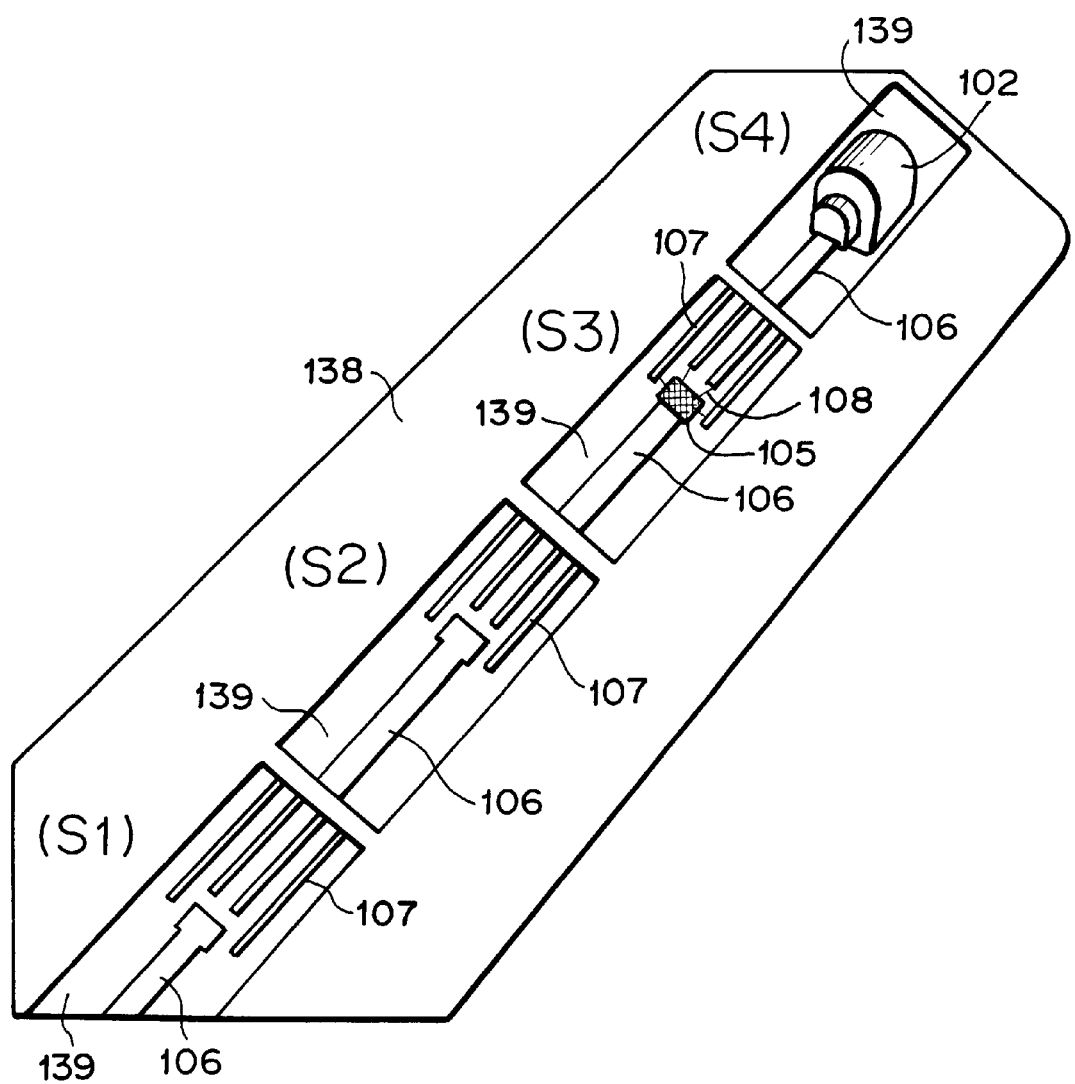
FIG. 20 is a diagram showing a method of manufacturing the flow rate sensor.

For example, as shown in FIG. 20, a plate raw material 138 is successively etched to form plate bases 139 each having a desired shape (S1), a silver plating treatment is conducted on the portion to which the flow rate detector 105 will be joined (S2), silver paste is coated to fix the flow rate detector 105, the flow rate detector 105 and each of the output terminals 107 are connected to each other by the boding wires 108, and then nickel plating treatment is conducted on the portion corresponding to the fin plate 106 (S3). The flow rate detector 105, the upper half portion of the fin plate 106 and the lower half portions of the output terminals 107 are molded by epoxy resin to form the housing 102 (S4), thereby manufacturing the flow rate sensor 101.

When the fin plate 110 and the output terminals 111 are formed from a single body, the same process as the case where the fin plate 106 and the output terminals 107 are formed from a single body at the same time is carried out except that the temperature detector 109 is used in place of the flow rate detector 105.

Figure 21:
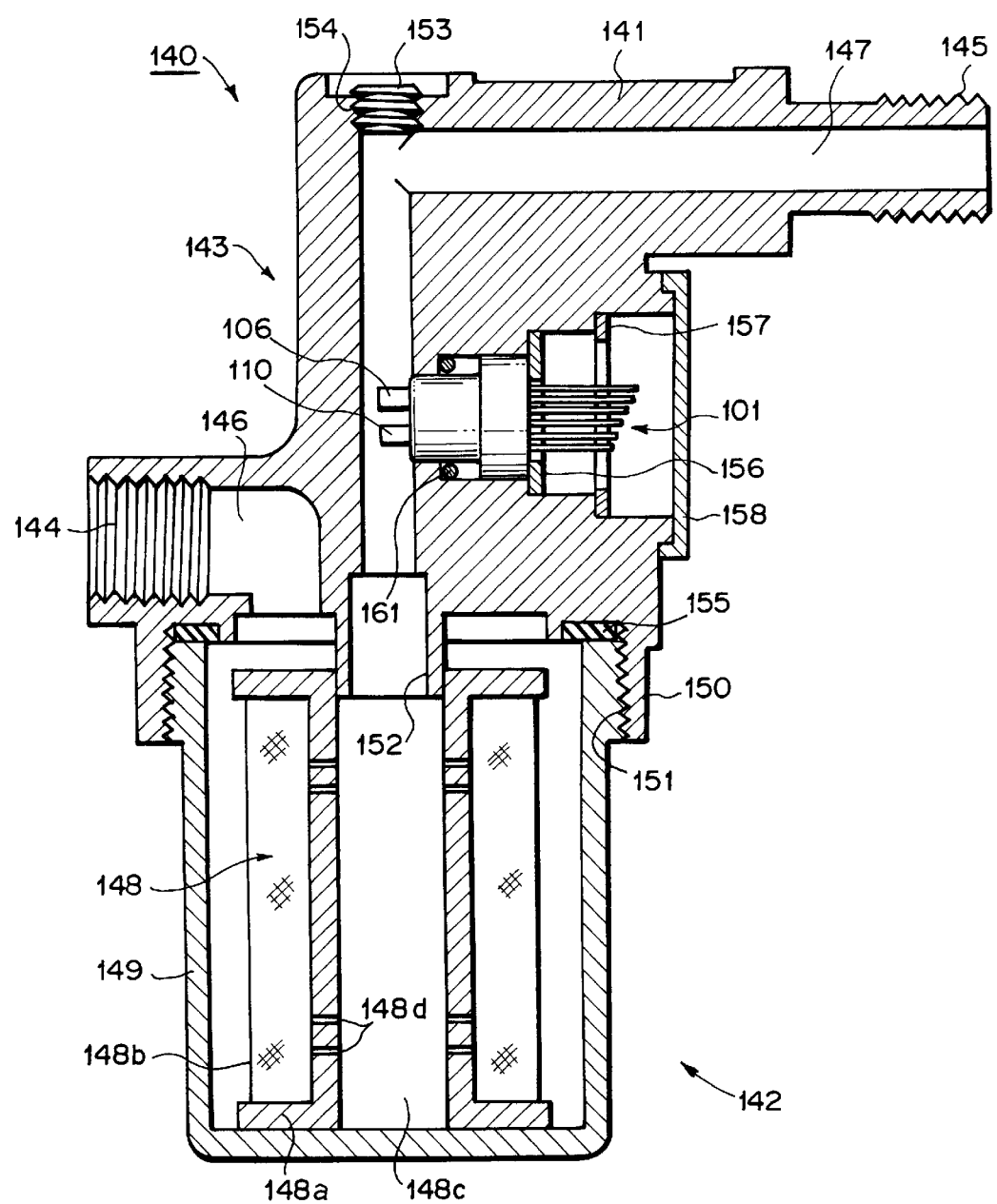
FIG. 21 is a longitudinally-sectional view showing an embodiment of a flow rate detecting apparatus in which the flow rate sensor is fitted.
Figure 22:
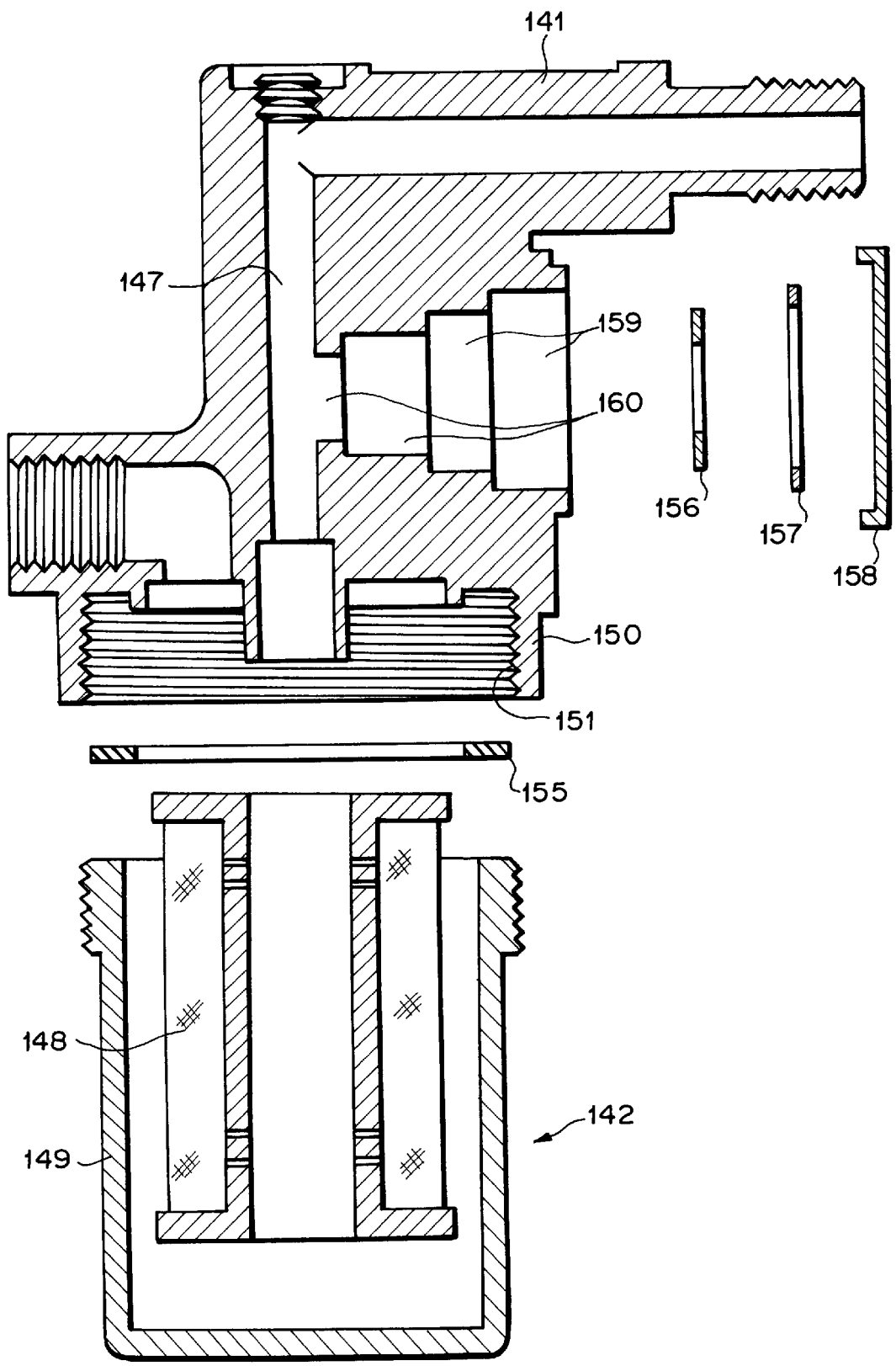
FIG. 22 is a longitudinally-sectional view showing the flow rate detecting apparatus from which the flow rate sensor is removed.

The flow rate sensor 101 of the present invention is used while inserted and fitted in a strainer-installed type flowmeter 140 as shown in FIGS. 21 and 22. In FIGS. 21 and 22, the strainer-installed type flowmeter 140 is achieved by integrating a strainer portion 142 and a flowmeter portion 143 into one body while a casing 141 is commonly used.

The casing 141 is achieved by die-casting aluminum, zinc, tin alloy or the like. Connecting portions 144, 145 are formed at both the end portions of the casing 141 to connect the casing 141 to external pipes, and a flow-in side fluid channel 146 and a flow-out side fluid channel 147 are formed in the casing 141. The strainer portion 142 comprises the lower left portion of the casing 141, a filtering member 148 and a filtering member inserting cylinder 149.

A cylinder fixing portion 150 which is slightly downwardly expanded is formed at the lower half portion of the casing 141, and a fixing recess portion 151 having a female screw portion on the inner peripheral surface thereof is formed at the inside of the cylinder fixing portion 150. An engaging projecting portion 152 is formed at the center portion of the fixing recess portion 151.

A vertical portion of the flow-in side fluid channel 146 opens upon the upper wall surface of the fixing recess portion 151, and a vertical portion of the flow-out side fluid channel 147 opens upon the lower end surface of the engaging projecting portion 152.

The vertical portion of the flow-out side fluid channel 147 has an air passage 153 at the upper portion thereof, a female screw portion is formed in the air passage 153, and a sealing member 154 is fastened to the female screw portion.

The filtering member 148 comprises a holder 148a and a filtering material 148b. The holder 148a is achieved by die-casting aluminum, zinc, tin alloy or the like, and flange portions at both the ends of the holder 148a are connected to each other by a cylindrical connection portion, and a through hole 148c is formed at the center portion thereof. Many small-diameter intercommunicating holes 148d are formed in the cylindrical connection portion of the holder 148a. The filtering material 148b comprises non-woven cloth of glass fiber, plastic fiber or the like, and it is mounted on the outer peripheral surface of the cylindrical connection portion of the holder 148a.

The filtering member inserting cylinder 149 is formed by die-casting aluminum, zinc, tin alloy or the like, and a male screw portion is formed on the outer peripheral surface of the upper end portion. The filtering member 148 is mounted at the center portion on the bottom surface of the filtering member inserting cylinder 149, and when the male screw portion of the filtering member inserting cylinder 149 is engaged with the female screw portion of the fixing recess portion 151 to make the upper end surface of the filtering member inserting cylinder 149 abut against the upper wall surface of the fixing recess portion 151 through an annular thin-plate sealing member 155, the upper end opening of the through hole 148c of the filtering member 148 is closed by the engaging projecting portion 152.

Kerosene is made to flow into the fluid channels 146, 147, and the sealing member 154 is fastened to the air passage 153 after it is checked that no air remains in the fluid channels. When kerosene flows through the flow-in side fluid channel 146 of the casing 141 and flows into the filtering member inserting cylinder 149, kerosene flows downwardly along the outer periphery of the filtering member 148, and is trapped on the bottom surface of the filtering member inserting cylinder 149.

Foreign matters such as dust, dirt, etc. are removed from kerosene while the kerosene passes through the filtering member 148b. The kerosene thus filtered passes through the intercommunicating holes 148d of the holder 148a, flows into the through hole 148c, flows through the opening of the vertical portion of the flow-out side fluid channel 147 to the flow-out side fluid channel 147, and then flows to the flowmeter portion 143. The flowmeter portion 143 comprises the upper right portion of the casing 141, the flow rate sensor 101, the sensor press plate 156, the flow rate detecting circuit board 157 and the lid 158.

As shown in FIG. 22, a recess portion on which the flow sensor is mounted is formed at the right half portion of the casing 141. The recess portion comprises a sensor insertion space 159 and a sensor insertion hole 160 which is formed so as to extend from the sensor insertion space 159 to the vertical portion of the flow-out side fluid channel 147. The lid 158 is formed by die-casting aluminum, zinc, tin alloy or the like, and it is detachably mounted on the casing 141.

The flow rate sensor 101 is engagedly inserted from the sensor insertion space 159 of the casing 141 to the sensor insertion hole 160 so that the lower ends of the fin plates 106, 110 extend to the left side of the axial line of the flow-out side fluid channel 147. In order to prevent leakage of fluid from the gap between the flow rate sensor 101 and the sensor insertion hole 160, an O-ring 161 is interposed at the step portion of the sensor insertion hole 160.

After the flow rate sensor 101 is fitted in the sensor insertion hole 160, the sensor press plate 156 is inserted into the sensor insertion space 159 to press the upper surface of the housing 102 of the flow rate sensor 101, and the sensor press plate 156 is fixed to the casing 141 by screws. Further, the flow rate detecting circuit board 157 is inserted into the sensor insertion space 159, and the lid 158 is mounted on and fixed to the casing 141, thereby fabricating the flow meter portion 143.

In the flow rate measuring portion 103 of the flow rate sensor 101, the temperature sensor 31 is heated by supplying current to the heater 33, and variation of the electrical resistance value of the temperature sensor 31 is detected. Here, since the flow rate sensor 101 is disposed so as to face the flow-out side fluid channel 147, a part of the heating value of the heater 33 is dispersed to kerosene flowing in the flow-out side fluid channel 147 through the fin plate 106, and the heating value transferred to the temperature sensor 31 is equal to the value achieved by subtracting the dispersed heating value from the heating value of the heater 33. The dispersed heating value is varied in accordance with the flow rate of kerosene, and thus the flow rate of kerosene flowing in the flow-out side fluid channel 147 can be measured by detecting the variation of the electrical resistance value of the temperature sensor 31 which varies in accordance with the heating value to be supplied thereto.

Since the dispersed heating value is also varied in accordance with the temperature of kerosene, the temperature compensating measuring portion 104 is provided in the flow rate sensor 101 to add a temperature compensating circuit to the flow rate detecting circuit for suppressing the error of the flow rate measurement value due to the temperature of kerosene at maximum.

Figure 23:
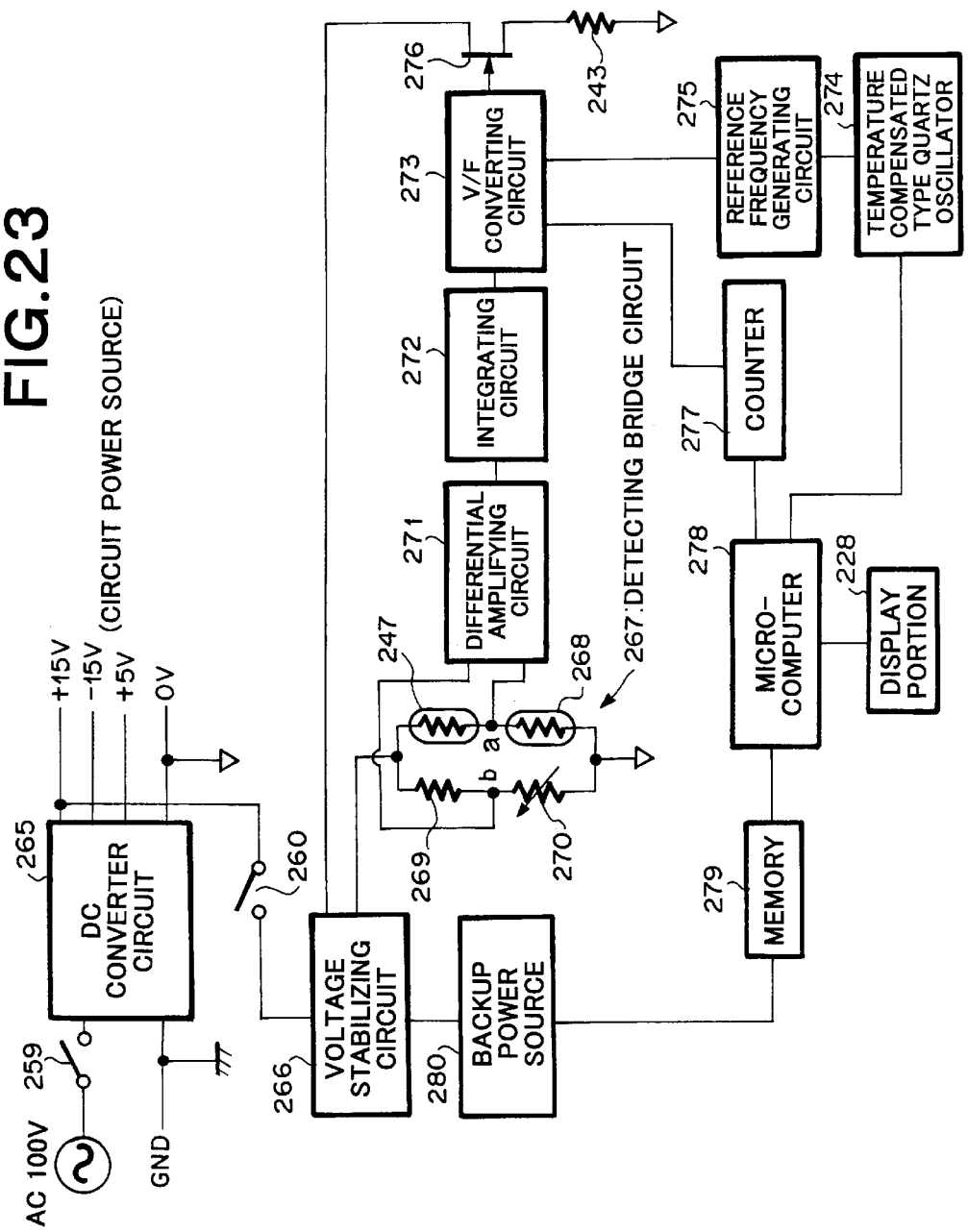
FIG. 23 is an electrical circuit diagram showing the flow rate detecting apparatus.
Figure 24A:
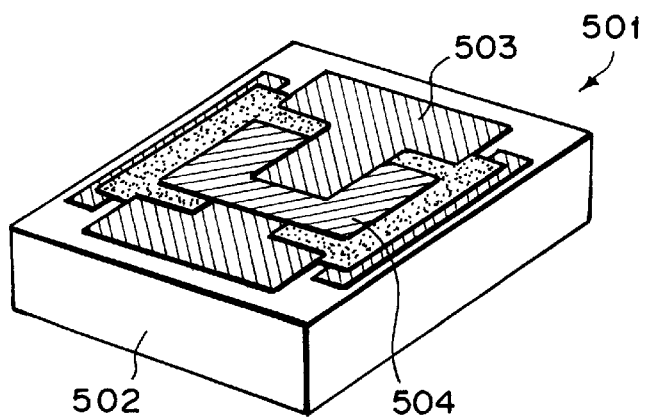
FIG. 24A is a perspective view showing a conventional flow rate sensor.
Figure 24B:
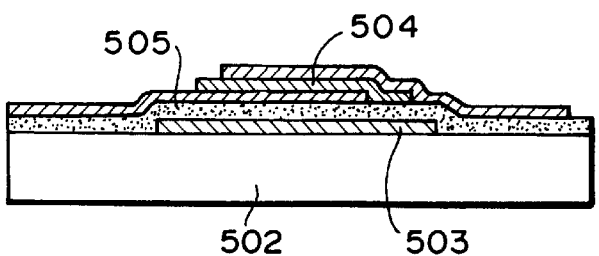
FIG. 24B is a longitudinally-sectional view of the flow rate sensor of FIG. 24A.
Figure 25:
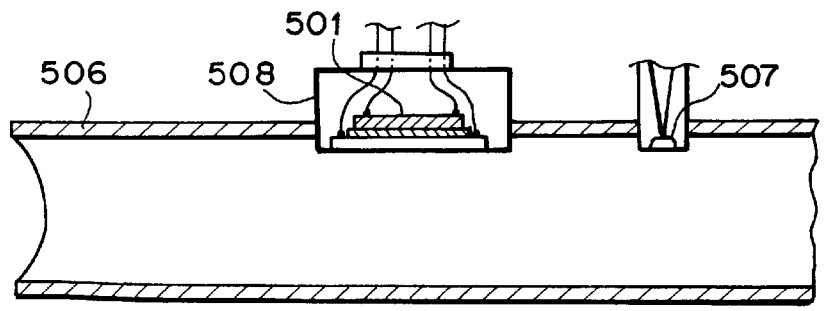
FIG. 25 is a cross-sectional view showing the state that the conventional flow rate sensor is disposed in a pipe.
Figure 26:
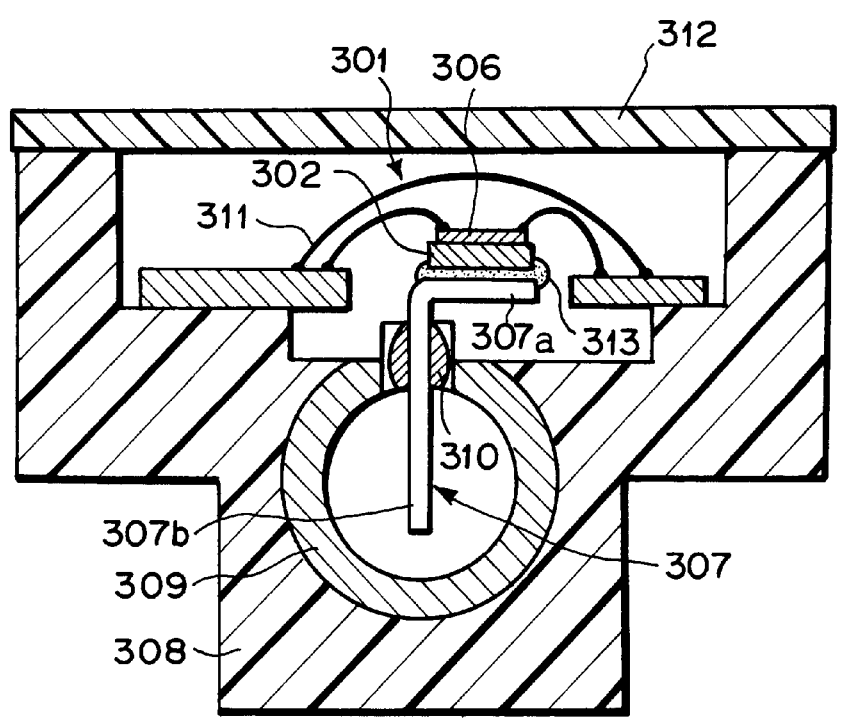
FIG. 26 is a diagram showing the flow rate sensor and the flow rate detecting apparatus.

The flow rate detecting circuit board 157 is electrically connected to the flow rate sensor 101, the display portion 228 provided on the surface of the casing 141 and a power supplying code, thereby constructing an electrical circuit as shown in FIG. 23.

In FIG. 23, AC 100V serving as a power source is converted to DC voltage having a proper voltage value by a DC converter circuit 265. The DC voltage thus achieved is stabilized by a voltage stabilizing circuit 266 to apply the DC voltage to a heater 243 (heater 33 of FIG. 3) of the flow rate measuring portion 103 of the flow rate sensor and a bridge circuit 267.

The bridge circuit 267 comprises a temperature sensor 247 (temperature sensor 31 of FIG. 3) of the flow rate measuring portion 103 of the flow rate sensor, a temperature sensor 268 (temperature sensor 31' of FIG. 4) of the temperature compensating measuring portion 104 of the flow rate sensor, a resistor 269 and a variable resistor 270. Since the electrical resistance value of the temperature sensor 247 is varied in accordance with the flow rate of kerosene, the voltage difference (potential difference) Va–Vb at the points a, b of the bridge circuit 267 is also varied. The voltage difference Va–Vb is input to a V/F converting circuit 273 through a differential amplifying circuit 271 and an integrating circuit 272, and a pulse signal having the frequency corresponding to an input voltage signal is formed in the V/F converting circuit 273. The frequency of the V/F converting circuit 273 is formed on the basis of a reference frequency which is set with a high-precision clock in a reference frequency generating circuit 275 on the basis of oscillation of a temperature compensated type quartz oscillator 274.

When the pulse signal output from the V/F converting circuit 273 is input to a transistor 276, current flows into the heater 243 to heat the heater 243. The pulse signal is counted by a counter 277, and the count value is converted to the flow rate corresponding to the frequency thereof in a microcomputer 278. The flow rate value thus achieved is digitally displayed on the display portion 228, and also stored in a memory 279.

Reference numeral 280 represents a backup power source such as a battery or the like.

The above circuit construction is equivalent to the circuit construction of FIG. 9 from which the memory in the sensor unit is removed.

INDUSTRIAL UTILITY

As described above, according to the flow rate sensor unit and the flowmeter of the present invention, even when the connection state between the chip of each of the flow rate detector and the fluid temperature detector and the thermal conductor or the leads is varied in accordance with an individual flow rate sensor unit, the flow rate measurement can be carried out with high precision by the flow rate sensor unit concerned. Further, when the flow sensor unit is used as a disposal one, the high measurement precision can be kept.

Further, according to the present invention, even when heat flow occurs between the inside of the housing and the outside of the housing through the leads, the thermal conduction between the fluid in the fluid channel and the inside of the housing through the thermal conductor can be excellently performed, so that the effect of the heat transfer from/into the inside of the housing through the leads can be effectively prevented from extending to the flow rate detector, and the flow rate measurement can be performed stably irrespective of the external environment and the variation thereof.

Still further, according to the flow rate sensor of the present invention, the flow rate measuring portion and the temperature compensating measuring portion are provided in one housing, so that the process of fabricating these measuring portions can be more simply performed and the manufacturing cost can be set to a lower value as compared with a case where the measuring portions are provided to different housings. Particularly in the process of fixing the bonding wires for connecting the flow rate detector and the temperature detector to the output terminals, the bonding wires can be gathered at one place and thus the fixing work can be efficiently performed.

What is claimed is:

1. A flow rate sensor unit in which a flow rate detector having a heater and a flow rate detecting temperature sensor is joined to a flow rate detecting thermal conductor, and the flow rate detector and a part of the flow rate detecting thermal conductor are accommodated in a housing, characterized in that said housing encloses in a space formed therein a memory for storing individual information of said flow rate sensor unit used when a flow rate value is achieved on the basis of a detection signal of a detecting circuit containing said heater and said flow rate detecting temperature sensor, and said flow rate detector and said memory are connected to plural leads in said space, said plural leads being partially exposed to the outside of said housing, wherein a fluid channel member having a fluid channel formed therein is connected to or formed integrally with said housing, and said flow rate detecting thermal conductor extends from said space into said fluid channel.

2. The flow rate sensor unit as claimed in claim 1, wherein a fluid temperature detector containing a fluid temperature detecting temperature sensor is joined to a fluid temperature detecting thermal conductor, said housing encloses in the space formed therein said fluid temperature detector and a part of said fluid temperature detecting thermal conductor, said detecting circuit contains said fluid temperature detecting temperature sensor, and in said space said fluid temperature detector is connected to plural leads which are partially exposed to the outside of said housing, and wherein said fluid temperature detecting thermal conductor extends from said space into said fluid channel.

3. The flow rate sensor unit as claimed in claim 1, wherein the individual information stored in said memory is correction information for a standard calibration curve used when the flow rate value is achieved on the basis of the detection signal of said detecting circuit.

4. A flowmeter including said flow rate sensor unit as claimed claim 1, and an electrical circuit portion connected to the leads of the flow rate sensor unit, wherein said electrical circuit portion achieves the fluid flow rate value on the basis of the detection signal of said detecting circuit by referring to a standard calibration curve stored in advance, and at that time corrects the standard calibration curve by using the individual information stored in said memory of said flow rate sensor unit.

5. The flowmeter as claimed in claim 4, wherein said electrical circuit portion includes an analog circuit portion for achieving the output corresponding to the flow rate of the fluid by using the detection signal of said detecting circuit, and a digital circuit portion for achieving the fluid flow rate value on the basis of the output of said analog circuit, and said digital circuit portion includes a microcomputer and a main memory for storing the standard calibration curve.

6. The flowmeter as claimed in claim 5, wherein the individual information stored in said memory of said flow rate sensor unit reflects plural relationships between the output value corresponding to the fluid flow rate actually-measured for said flow rate sensor unit and the true fluid flow rate value.

7. The flowmeter as claimed in claim 4, wherein said leads of said flow rate sensor unit and said electrical circuit portion are detachably connected to each other.

8. A flow rate sensor unit in which a flow rate detector having a heater and a flow rate detecting temperature sensor is joined to a flow rate detecting thermal conductor, and the flow rate detector and a part of the flow rate detecting thermal conductor are accommodated in a housing, characterized in that a fluid channel member having a fluid channel formed therein is connected to or formed integrally with said housing having a space formed therein, said flow rate detecting thermal conductor extends from said space into said fluid channel, a thermal conductor other than said flow rate detecting thermal conductor is disposed so as to extend from said space into said fluid channel, said housing encloses in the space formed therein a memory for storing individual information of said flow rate sensor unit used when a flow rate value is achieved on the basis of a detection signal of a detecting circuit containing said heater and said flow rate detecting temperature sensor, and said flow rate detector and said memory are connected to plural leads in said space, said plural leads being partially exposed to the outside of said housing.

9. The flow rate sensor unit as claimed in claim 8, wherein a fluid temperature detector containing a fluid temperature detecting temperature sensor is joined to a fluid temperature detecting thermal conductor, said housing encloses in the space formed therein said fluid temperature detector and a part of said fluid temperature detecting thermal conductor, said fluid temperature detecting thermal conductor extends from said space into said fluid channel, said detecting circuit contains said fluid temperature detecting temperature sensor, and in said space said fluid temperature detector is connected to plural leads which are partially exposed to the outside of said housing.

10. The flow rate sensor unit as claimed in claim 8, wherein the individual information stored in said memory is correction information for a standard calibration curve used when the flow rate value is achieved by using the detection signal of said detecting circuit.

11. The flow rate sensor unit as claimed in claim 8, wherein said thermal conductor extends to be nearer to the portions of said leads in said housing than said flow rate detecting thermal conductor.

12. The flow rate sensor unit as claimed in claim 9, wherein said thermal conductor extends to be nearer to the portions of said leads in said housing than said fluid temperature detecting thermal conductor.

13. The flow rate sensor unit as claimed in claim 8, wherein said memory is joined to said thermal conductor.

14. The flow rate sensor unit as claimed in claim 9, wherein said flow rate detecting thermal conductor, said fluid temperature detecting thermal conductor and said thermal conductor are designed in a plate shape, and arranged along the direction of said fluid channel on the same plane in said fluid channel.

15. A flowmeter containing said flow rate sensor unit as claimed in claim 8, and an electrical circuit portion connected to the leads of said flow rate sensor unit, wherein said electrical circuit portion achieves the fluid flow rate value on the basis of the detection signal of said detecting circuit by referring to a standard calibration curve stored in advance, and at that time corrects the standard calibration curve by using the individual information stored in said memory of said flow rate sensor unit.

16. The flowmeter as claimed in claim 15, wherein said electrical circuit portion includes an analog circuit portion for achieving the output corresponding to the flow rate of the fluid by using the detection signal of said detecting circuit, and a digital circuit portion for achieving the fluid flow rate value on the basis of the output of said analog circuit, and said digital circuit portion includes a microcomputer and a main memory for storing the standard calibration curve.

17. The flowmeter as claimed in claim 16, wherein the individual information stored in said memory of said flow rate sensor unit reflects plural relationships between the output value corresponding to the fluid flow rate actually-measured for said flow rate sensor unit and the true fluid flow rate value.

18. The flowmeter as claimed in claim 15, wherein said leads of said flow rate sensor unit and said electrical circuit portion are detachably connected to each other.

19. A flow rate sensor comprising a flow rate measuring portion for detecting the flow rate of fluid, a temperature compensating measuring portion for compensating an effect of fluid temperature on measurements of said flow rate measuring portion, and a housing, wherein said flow rate measuring portion includes a flow rate detector having a heater and a temperature sensor laminated each other through an insulator, a fin plate joined to the flow rate detector at one end thereof, and an output terminal electrically connected to the flow rate detector, said temperature compensating measuring portion includes a temperature detector having an insulator and a temperature sensor that are laminated on each other, a fin plate joined to said temperature detector at one end thereof, and an output terminal electrically connected to said temperature detector, said housing encloses said flow rate detector and said temperature detector therein, and said fin plates and the output terminals of said flow rate measuring portion and said temperature compensating measuring portion are projected to the outside of said housing.

20. The flow rate sensor as claimed in claim 19, wherein said housing is formed of synthetic resin having thermal conductivity of 0.7 w/m·K or less.

21. The flow rate sensor as claimed in claim 19, wherein a cavity portion is provided in said housing, and said flow rate detector and said temperature detector are mounted at a position of the cavity portion at which said flow rate detector and said temperature detector are not brought into contact with said housing.

* * * * *